US008297859B2

(12) United States Patent
Kojima

(10) Patent No.: US 8,297,859 B2
(45) Date of Patent: Oct. 30, 2012

(54) PRINTER INCLUDING COLOR MATERIAL CARTRIDGE HAVING REMOVABLY ATTACHED ADVANCE PAYMENT INFORMATION STORAGE SECTION

(75) Inventor: Teruhito Kojima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1151 days.

(21) Appl. No.: 11/717,861

(22) Filed: Mar. 13, 2007

(65) Prior Publication Data

US 2007/0217848 A1  Sep. 20, 2007

(30) Foreign Application Priority Data

Mar. 14, 2006  (JP) .................. 2006-069934
Apr. 12, 2006  (JP) .................. 2006-109991

(51) Int. Cl.
*B41J 2/175* (2006.01)
(52) U.S. Cl. .............. 400/76; 347/86; 705/400
(58) Field of Classification Search ............ 400/76
See application file for complete search history.

(56) References Cited

U.S. PATENT DOCUMENTS

| 7,509,062 | B2 | 3/2009 | Kikuchi et al. | |
|---|---|---|---|---|
| 2003/0035016 | A1* | 2/2003 | Tanaka | 347/19 |
| 2004/0040614 | A1 | 3/2004 | Sesek et al. | |
| 2006/0045595 | A1 | 3/2006 | Hanaoka | |

FOREIGN PATENT DOCUMENTS

| EP | 0875862 A2 | 11/1998 |
|---|---|---|
| EP | 0881086 A2 | 12/1998 |
| EP | 1170134 A1 | 1/2002 |
| JP | 2002-215368 | 8/2002 |
| JP | 2003122209 A | 4/2003 |
| JP | 2004090517 A | 3/2004 |
| JP | 2004-233472 A | 8/2004 |
| JP | 2004249506 A | 9/2004 |
| JP | 2005-288988 A | 10/2005 |
| JP | 2006030929 A | 2/2006 |

OTHER PUBLICATIONS

European Search Report Issued Jul. 18, 2008.
Japanese Office Action issued on Jan. 5, 2010 in the Japanese Patent Application which corresponds to the present application.

* cited by examiner

*Primary Examiner* — Leslie J Evanisko
(74) *Attorney, Agent, or Firm* — Nutter McClennen & Fish LLP; John J. Penny, Jr.; Christina M. Sperry

(57) ABSTRACT

A printing method is provided for printing on a medium with a color material by a printer including a cartridge accommodating section that removably accommodates a cartridge to which an advance payment information storage section for storing therein advance payment information is attached and which contains the color material. The printing method includes the steps of: reading/writing the advance payment information to/from the advance payment information storage section of the cartridge accommodated in the cartridge accommodating section; outputting a print driving signal for controlling to print; printing by using the color material in the cartridge based on the print driving signal outputted by the print controlling step; acquiring the print driving signal outputted by the print controlling step and converting the print driving signal to accounting information; and settling the advance payment information read by the advance payment information reading/writing step by the accounting information converted by the print driving signal converting step.

4 Claims, 30 Drawing Sheets

58 ⟶    170 ⟶

A

| PURCHASE CREDIT | 3000 |
|---|---|
| REMAINING CREDIT | 2000 |

| READ CREDIT | 0 (INITIAL VALUE) |
|---|---|
| USED CREDIT | 0 (INITIAL VALUE) |
| SETTLED CREDIT | 0 (INITIAL VALUE) |

B

| PURCHASE CREDIT | 3000 |
|---|---|
| REMAINING CREDIT | 1000 |

| READ CREDIT | 1000 |
|---|---|
| USED CREDIT | 0 (INITIAL VALUE) |
| SETTLED CREDIT | 0 (INITIAL VALUE) |

C

| PURCHASE CREDIT | 3000 |
|---|---|
| REMAINING CREDIT | 1000 |

| READ CREDIT | 1000 |
|---|---|
| USED CREDIT | 20 |
| SETTLED CREDIT | 980 |

D

| PURCHASE CREDIT | 3000 |
|---|---|
| REMAINING CREDIT | 1000 |

| READ CREDIT | 1000 |
|---|---|
| USED CREDIT | 30 |
| SETTLED CREDIT | 970 |

E

| PURCHASE CREDIT | 3000 |
|---|---|
| REMAINING CREDIT | 1970 |

| READ CREDIT | 0 (INITIAL VALUE) |
|---|---|
| USED CREDIT | 0 (INITIAL VALUE) |
| SETTLED CREDIT | 0 (INITIAL VALUE) |

*FIG. 5*

|   | 58 | | 170 | |
|---|---|---|---|---|
| A | PURCHASE CREDIT | 3000 | READ CREDIT | 0 (INITIAL VALUE) |
|   | REMAINING CREDIT | 2000 | USED CREDIT | 0 (INITIAL VALUE) |
|   |   |   | SETTLED CREDIT | 0 (INITIAL VALUE) |
| B | PURCHASE CREDIT | 3000 | READ CREDIT | 100 |
|   | REMAINING CREDIT | 1900 | USED CREDIT | 0 (INITIAL VALUE) |
|   |   |   | SETTLED CREDIT | 0 (INITIAL VALUE) |
| C | PURCHASE CREDIT | 3000 | READ CREDIT | 100 |
|   | REMAINING CREDIT | 1900 | USED CREDIT | 20 |
|   |   |   | SETTLED CREDIT | 80 |
| D | PURCHASE CREDIT | 3000 | READ CREDIT | 200 |
|   | REMAINING CREDIT | 1800 | USED CREDIT | 30 |
|   |   |   | SETTLED CREDIT | 170 |
| E | PURCHASE CREDIT | 3000 | READ CREDIT | 0 (INITIAL VALUE) |
|   | REMAINING CREDIT | 1970 | USED CREDIT | 0 (INITIAL VALUE) |
|   |   |   | SETTLED CREDIT | 0 (INITIAL VALUE) |

FIG. 7

| REMAINING CREDIT POSSIBLE AMOUNT OF PRINTING (REMAINING AMOUNT OF INK) | |
|---|---|
| REMAINING CREDIT | 1000 CREDIT |
| POSSIBLE AMOUNT OF PRINTING (C) | ○○ |
| POSSIBLE AMOUNT OF PRINTING (M) | △△ |
| POSSIBLE AMOUNT OF PRINTING (Y) | □□ |
| POSSIBLE AMOUNT OF PRINTING (K) | ×× |

FIG. 8

PRINTER INCLUDING COLOR MATERIAL CARTRIDGE HAVING REMOVABLY ATTACHED ADVANCE PAYMENT INFORMATION STORAGE SECTION

CROSS REFERENCE TO RELATED APPLICATION

The present application claims priority from Japanese Patent Application(s) No. 2006-069934 filed on Mar. 14, 2006 and No. 2006-109991 filed on Apr. 12, 2006, the contents of which are incorporated herein by reference.

BACKGROUND

1. Field of the Invention

The present invention relates to a printing method, a color material cartridge and a printer. Particularly, the present invention relates to a printing method for printing on a medium with a color material, a color material cartridge that stores therein advance payment information on a printing and a printer that reads/writes the advance payment information.

2. Related Art

A printer system that calculates the charge for a user of the printer has been known, for example, as disclosed in Japanese Patent Application Publication No. 2002-215368. The printer system calculates the charge of the printer based on various parameters such as the volume of file spooled and the amount of consumable supplies. However, there has been a problem that the provider of the printer system can not easily collect the charge from the user. Thus, a prepaid printer system being capable of easily collecting the charge from the user is considered. For example, a prepaid printer system in which information on credits (charge) is stored in the IC chip and the IC chip is mounted on an ink cartridge removably attached to the printer is considered.

However, in the case that the ink cartridge already has the IC chip storing therein information on ink, if a new IC chip storing therein information on ink is mounted on the ink cartridge, the printer can not read/write the information on ink stored in the added new IC chip.

SUMMARY

To solve the above-described problems, a first aspect of the present invention provides a printing method for printing on a medium with a color material by a printer including a cartridge accommodating section that removably accommodates a cartridge to which an advance payment information storage section for storing therein advance payment information is attached and which contains the color material. The printing method includes the steps of: reading/writing the advance payment information to/from the advance payment information storage section of the cartridge accommodated in the cartridge accommodating section, outputting a print driving signal for controlling to print; printing by using the color material in the cartridge based on the print driving signal outputted by the print controlling step; acquiring the print driving signal outputted by the print controlling step and converting the print driving signal to accounting information; and settling the advance payment information read by the advance payment information reading/writing step by the accounting information converted by the print driving signal converting step.

A second aspect of the present invention provides a printer that prints on a medium with a color material. The printer includes: a cartridge accommodating section that removably accommodates a cartridge to which an advance payment information storage section for storing therein advance payment information is attached and which contains the color material; an advance payment information reading/writing section that reads/writes the advance payment information to/from the advance payment information storage section accommodated in the cartridge accommodating section; a print control section that outputs a print driving signal for controlling to print; a printing section that prints by using the color material in the cartridge based on the print driving signal outputted from the print control section; a print driving signal converting section that acquires the print driving signal outputted from the print control section and converts the same to accounting information; and a settlement section that settles the advance payment information read by the advance payment information reading/writing section based on the accounting information converted by the print driving signal converting section. Thereby the charge can be easily collected without using a card or the like.

The print control section may prevent the printing section from printing when the advance payment information read by the advance payment information reading/writing section indicates that there is no advance payment. Thereby when the charge is not paid before using the printer and the paid charge is consumed because of using the printer, any printing can be prevented from being performed.

The print control section may prevent the printing section from printing when the advance payment information is not read from the cartridge accommodated in the cartridge accommodating section. Thereby when the charge is not paid before using the printer, any printing can be prevented from being performed.

The advance payment information storage section may be removably attached to the cartridge. Thereby even if there is no ink in the cartridge before the paid charge is consumed because of using the printer, the printer can be used by using the charge paid by attaching the advance payment information storage section to the other cartridge.

The cartridge may include an ink information storage section that stores therein information on a color material. Thereby the charge can be easily collected by using the existing cartridge.

The cartridge may include ink information storage section that stores therein information on the used amount of printing the cartridge. The advance payment information reading/writing section may read the advance payment information corresponding to the remaining amount enough to print with the cartridge based on the information on the amount of printing stored in the ink information storage section before the printing section prints. The print control section may output the print driving signal to the printing section provided that the advance payment information corresponding to the remaining amount is read from the advance payment information reading/writing section. Thereby the charge can be easily collected dependent on the amount of ink used.

A third aspect of the present invention provides a cartridge removably accommodated in a printer. The cartridge includes: a cartridge body that contains a color material; and an advance payment information storage section attached to the cartridge body that stores therein advance payment information read/written by the printer. The advance payment information read by the printer is settled by accounting information converted based on a print driving signal that controlled the printer to print. Thereby an advantage the same as that of the first aspect can be achieved.

A fourth aspect of the present invention provides a color material cartridge including: a cartridge body that contains a color material; a color material information storage section that stores therein color material information on the color material; and an advance payment information storage section that stores therein advance payment information on a printing. The color material information storage section includes a connecting terminal connecting to an external reading/writing device and a connecting line connecting to the advance payment information storage section. The advance payment information storage section connects to the reading/writing device through the connecting line. Thereby a function to read/write the color material information and the advance payment information can be easily implemented by the connecting line on the ink cartridge side.

A fifth aspect of the present invention provides a color material cartridge including: a cartridge body that stores therein a color material; a color material information storage section that stores therein color material information on the color material; and an advance payment information storage section that stores therein advance payment information on a printing. The advance payment information storage section includes a connecting terminal connecting to an external reading/writing device and a connecting line connecting to the color material information storage section. The color material information storage section connects to the reading/writing device through the connecting line. Thereby a function to read/write the color material information and the advance payment information can be easily implemented by the connecting line on the ink cartridge side.

A sixth aspect of the present invention provides a color material cartridge including: a cartridge body that contains a color material; a color material information storage section that stores therein color material information on the color material; and an advance payment information storage section that stores therein advance payment information on a printing. Each of the color material information storage section and the advance payment information storage section includes a connecting terminal connecting to an external reading/writing device. Thereby a function to read/write the color material information and the advance payment information can be individually implemented on the printer side.

A seventh aspect of the present invention provides a printer that prints on a medium with a color material. The printer includes: a cartridge accommodating section that removably accommodates a cartridge to which a color material information storage section for storing, therein color material information on a color material and an advance payment information storage section for storing therein advance payment information on a printing are attached and which contains the color material, a reading/writing section connected to the color material information storage section of the cartridge accommodated in the cartridge accommodating section that reads/writes the color material information to/from the color material information storage section; a connecting line that connects the color material information storage section to the advance payment information storage section of the cartridge accommodated in the cartridge accommodating section; a print control section that outputs a print driving signal for controlling to print; a printing section that prints by using the color material in the cartridge based on the print driving signal outputted by the print control section; a print driving signal converting section that acquires the print driving signal outputted by the print control section and converts the same to accounting information; and a settlement section that settles the advance payment information based on the accounting information converted by the print driving signal converting section. The reading/writing section reads/writes the advance payment information of the advance payment information storage section through the connecting line. Thereby a function to read/write the color material information and the advance payment information can be easily implemented by the connecting line on the printer side.

An eighth aspect of the present invention provides a printer that prints on a medium with a color material. The printer includes: a cartridge accommodating section that removably accommodates a cartridge to which a color material information storage section for storing therein color material information on a color material and an advance payment information storage section for storing therein advance payment information on a printing are attached and which contains the color material; a reading/writing section connected to the advance payment information storage section of the cartridge accommodated in the cartridge accommodating section that reads/writes the advance payment information to/from the advance payment information storage section; a connecting line that connects the color material information storage section to the advance payment information storage section of the cartridge accommodated in the cartridge accommodating section; a print control section that outputs a print driving signal for controlling to print; a printing section that prints by using the color material in the cartridge based on the print driving signal outputted by the print control section; a print driving signal converting section that acquires the print driving signal outputted by the print control section and converts the same to accounting information; and a settlement section that settles the advance payment information based on the accounting information converted by the print driving signal converting section. The reading/writing section reads/writes the color material information of the color material information storage section through the connecting line. Thereby a function to read/write the color material information and the advance payment information can be easily implemented by the connecting line on the printer side.

A ninth aspect of the present invention provides a printer that prints on a medium with a color material. The printer includes: a cartridge accommodating section that removably accommodates a cartridge to which a color material information storage section for storing therein color material information on a color material and an advance payment information storage section for storing therein advance payment information on a printing are attached and which contains the color material; a reading/writing section connected to each of the color material information storage section and the advance payment information storage section of the cartridge accommodated in the cartridge accommodating section that reads/writes the color material information and the advance payment information to/from the color material information storage section and the advance payment information storage section; a print control section that outputs a print driving signal for controlling to print; a printing section that prints by using the color material in the cartridge based on a print driving signal outputted by the print control section; a print driving signal converting section that acquires the print driving signal outputted by the print control section and converts the same to accounting information; and a settlement section that settles the advance payment information based on the accounting information converted by the print driving signal converting section. Thereby an advantage the same as that of the seventh aspect can be achieved.

Here, all necessary features of the present invention are not listed in the summary of the invention. The sub-combinations of the features may become the invention.

BRIEF DESCRIPTION OF THE DRAWINGS

FIG. 5 is a schematic diagram showing the stored credits;

FIG. 7 is a schematic diagram showing the stored credits;

FIG. 8 shows an example of display screen shown by a display 14;

DESCRIPTION OF EXEMPLARY EMBODIMENTS

Hereinafter, the present invention will now be described through referred embodiments with reference to the drawings.

Figure 1:
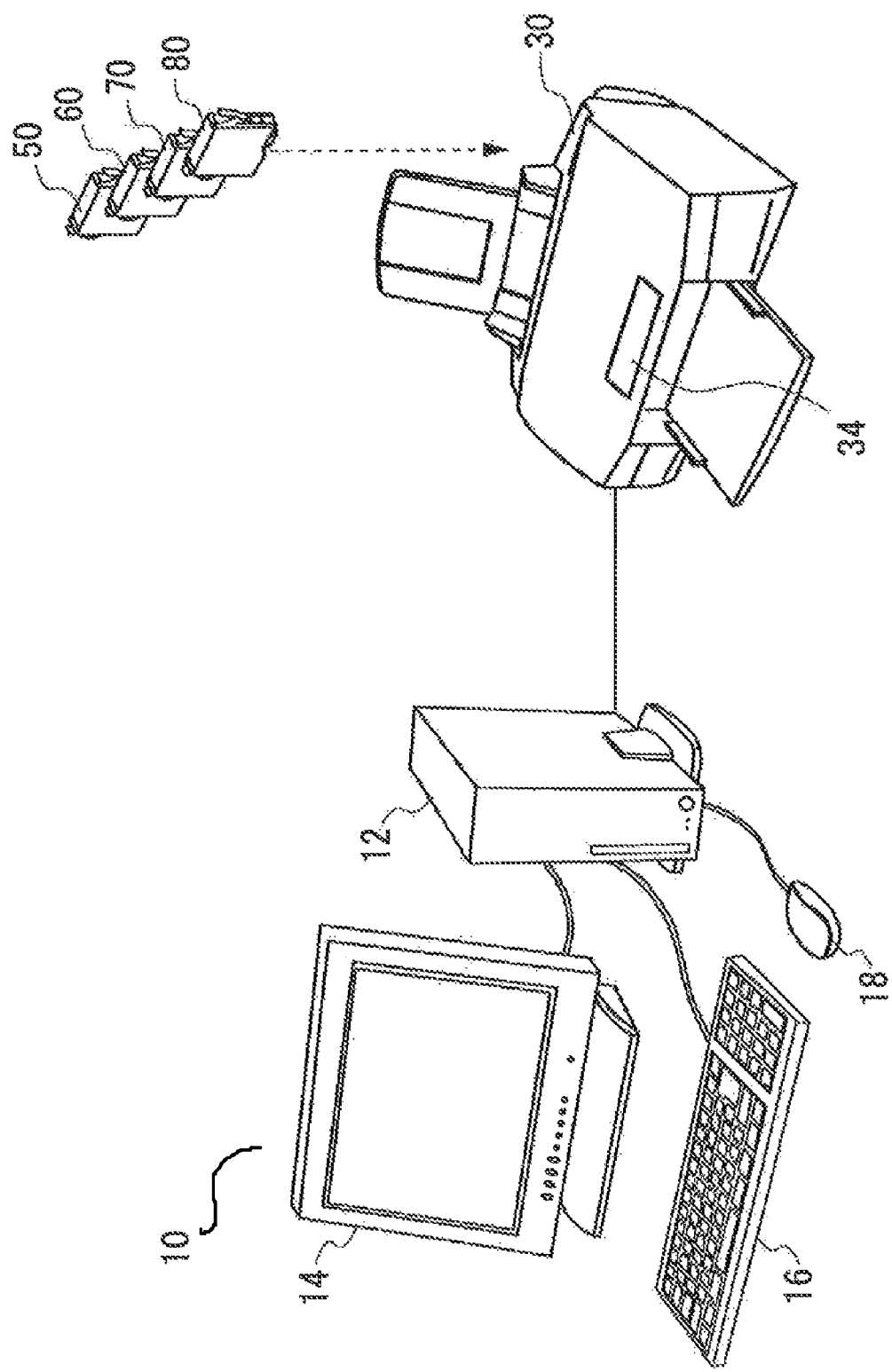
FIG. 1 shows an example of printer 30.

FIG. 1 is an example of printer 30. The printer 30 prints on a medium with ink. The printer 30 removably accommodates cartridges 50, 60, 70 and 80 which contain ink. The cartridges 50, 60, 70 and 80 contain ink such as black, cyan, magenta and yellow. The printer 30 includes a display 34 such as a LCD. Additionally, the printer 30 is connected to a personal computer 10. The personal computer 10 includes a main body 12, a display 14, a keyboard 16 and a mouse 18.

Figure 2A:
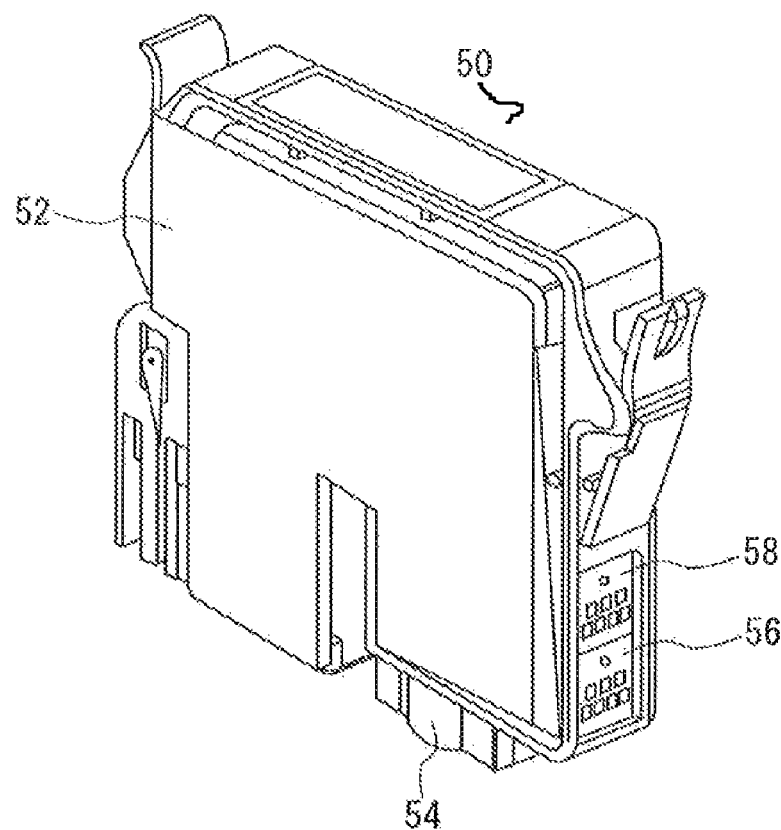
FIG. 2A is a perspective view showing a cartridge 50 and FIG. 2B is a perspective view showing a cartridge 60.

FIG. 2A shows a perspective view showing the cartridge 50. The cartridge 50 includes an ink supply port 54 that supplies ink to the printer 30, an ink information storage section that stores therein information on the ink and an advance payment information storage section that stores therein advance payment information. For example, the ink information storage section 56 may be an IC chip including a contact terminal that is in electrically contact with a reading/writing section on the printer 30 side and a memory in electrically contact with the contact terminal that stores therein information. For example, in the same way, the advance payment information storage section 58 may be an IC chip including a contact terminal that is in electrically contact with a reading/writing section on the printer 30 side and a memory in electrically contact with the contact terminal that stores therein information. Here, the ink information storage section 56 and the advance payment information storage section 58 may read/write information not only in the contact manner but also in a noncontact manner. In this case, the ink information storage section 56 and the advance payment information storage section 58 may be a magnetic memory or an optical memory.

The ink information storage section 56 stores information on the amount of ink as the information on ink. For example, the ink information storage section 56 stores therein the amount of ink at the time of purchasing the cartridge. The ink information storage section 56 may further store information on the color of ink as the information on ink. Hereinafter, the amount of ink at the time of purchasing the cartridge is referred to as "the purchased amount of printing, and the amount of ink used is referred to as "the used amount of printing".

The advance payment information storage section 58 stores therein as a purchase credit being advance payment information a credit previously purchased as the charge of the printer 30. Additionally, the advance payment information storage section 58 stores therein a remaining credit as a credit which has not been consumed and remains in addition to the purchase credit. The advance payment information storage section 58 may store therein a consumed credit instead of the remaining credit. It is preferred that the initial value of the credit stored in the advance payment information storage section 58 is a value corresponding to the number of head-shots for completely using the amount of initial filling of ink in the cartridge by the credit, or less than that a little. Additionally, the advance payment information storage section 58 may store therein identification data indicative of the validity of the purchase credit in addition to the credit. The advance payment information storage section 58 is removably attached to the cartridge body 52.

Figure 2B:
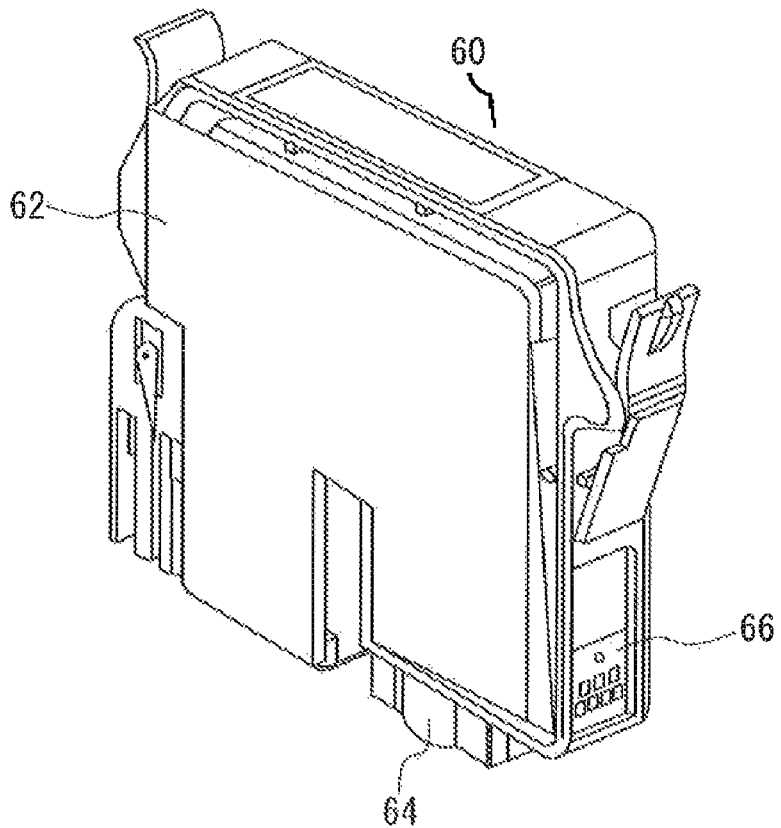

FIG. 2B is a perspective view of the cartridge 60. The cartridge 60 includes a cartridge body 62 that contains ink, an ink supply port 64 that supplies ink to the printer 30 and an ink information storage section that stores therein information on the ink. Here, the cartridges 70 and 80 includes their respective cartridge bodies, ink supply ports, and ink information storage sections as does the cartridge 60.

Figure 3:
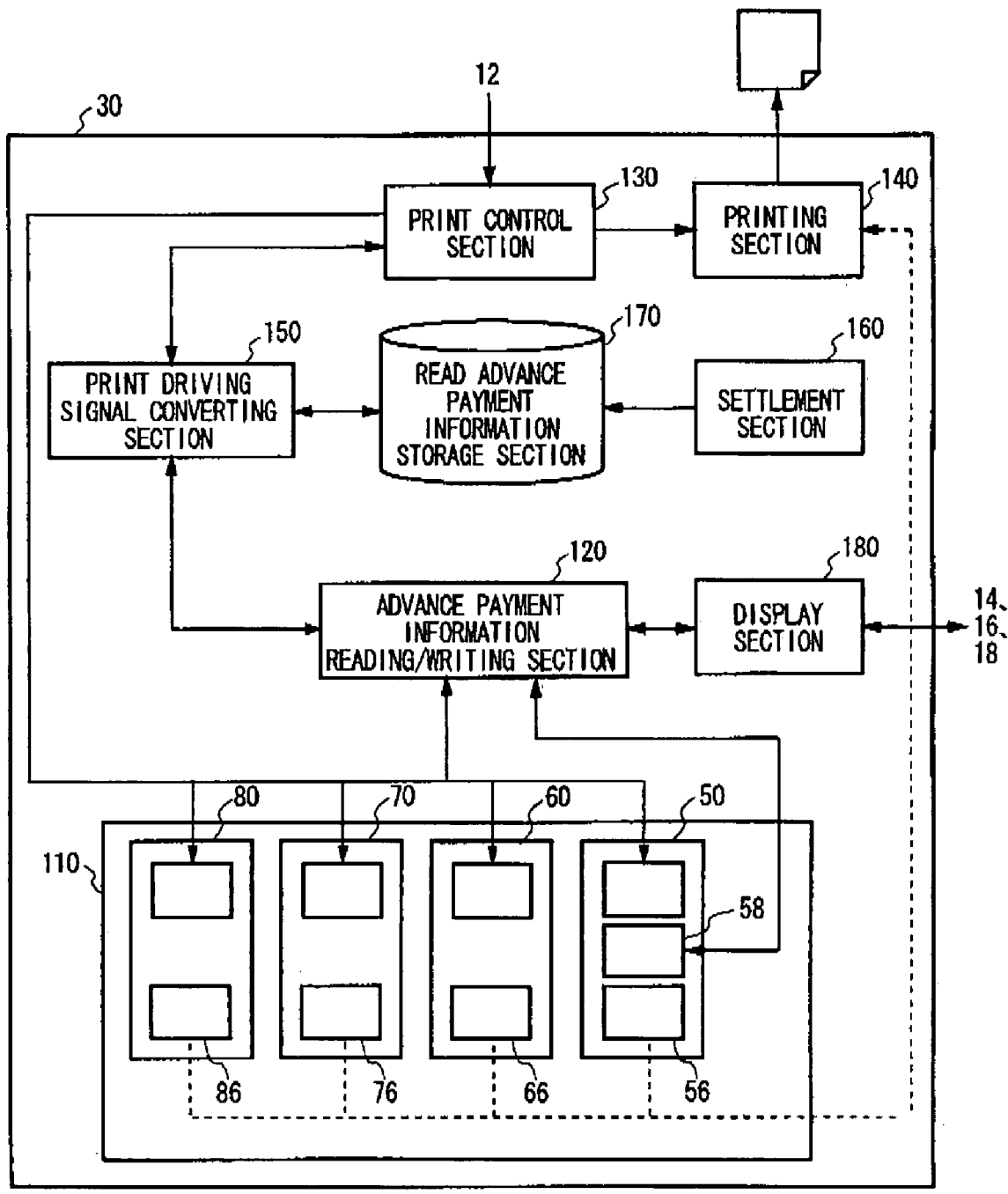
FIG. 3 shows an example of block diagram of a printer 30.

FIG. 3 shows an example of block diagram of the printer 30. The printer 30 includes a cartridge accommodating section 111, an advance payment information reading/writing section 120, a print control section 130, a printing section 140, a print driving signal converting section 150, a settlement section 160, a read advance payment information storage section 170 and a display section 180.

The cartridge accommodating section 111 removably accommodates cartridges 50, 60, 70 and 80. The advance payment information reading/writing section 120 reads/ writes the purchased amount of printing and the used amount of printing to/from ink information storage sections 56, 66, 76 and 86 of the cartridges 50, 60, 70 and 80 accommodated in the cartridge accommodating section 111. Additionally, the advance payment information reading/writing section 120 reads/writes a credit to/from the advance payment information storage section 58 of the cartridge 50 accommodated in the cartridge accommodating section 111.

The read advance payment information storage section 170 stores therein a read credit read from the advance payment information storage section 58, a used credit consumed by using the printer 30 and a settled credit obtained by subtracting the used credit from the read credit.

The print control section 130 accepts a print job from the personal computer 10 and outputs a print driving signal for controlling to print. Additionally, the print control section 130 updates the used amount of printing stored in the ink information storage section 56. The printing section 140 prints with the ink in the cartridges 50, 60, 70 and 80 based on the print driving signal outputted by the print control section 130.

The print driving signal converting section 150 converts the print driving signal to accounting information. That is, the print driving signal converting section 150 calculates a used credit as the accounting information based on the print driving signal. The print driving signal converting section 150 calculates a credit to be read from the advance payment information storage section 58 based on the used amount of printing or the like. For example, the print driving signal converting section 150 previously stores conversion information indicating that 1000 shots is equal to one credit.

The settlement section 160 settles the read credit stored in the read advance payment information storage section 170 by the used credit converted by the print driving signal converting section 150. The display section 180 displays the amount of printing, the credit and an error message or the like on the display section 14.

Figure 4:
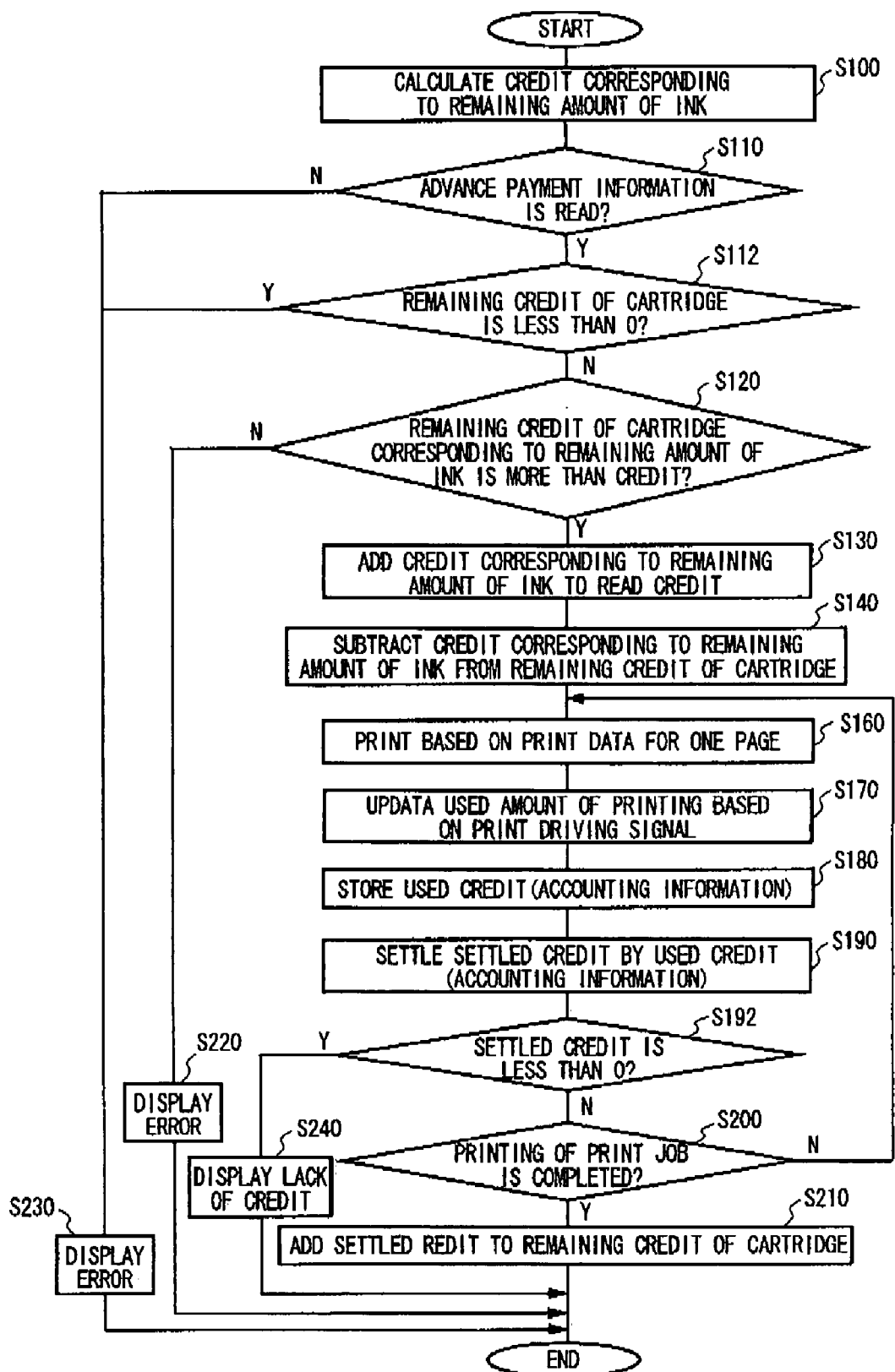
FIG. 4 is a flowchart showing an example of operation of the printer 30.

FIG. 4 shows a flowchart showing an example of operation of the printer 30. FIG. 5 is a schematic block diagram showing credits of the advance payment information storage section 58 and the read advance payment information storage section 170. The flowchart shown in FIG. 4 employs so called a deposit system that subtracts the credit for printing with the remaining amount of ink in cartridges 50, 60, 70 and 80 which is assumed as enough to print from the advance payment before printing.

The flowchart shown in FIG. 4 starts at receiving a print job from the personal computer 10 by the print control section 130 of the printer 30. Here, at sting the flowchart shown in FIG. 4, the cartridge accommodating section 111 accommodates the cartridges 50, 60, 70 and 80. The advance payment information storage section 58 of the cartridge 50 stores therein a purchase credit "3000" and a remaining credit "2000" as shown in FIG. 5A. The read advance payment information storage section 170 of the printer 30 stores therein as the initial value a read credit "0", a used credit "0" and a settled credit "0".

The print control section 130 transfers a notification indicating that the print job is accepted to the print driving signal converting section 150. The print driving signal converting section 150 acquires the purchased amount of printing and the used amount of printing stored in the ink information storage section 56 of the cartridge 50. The print driving signal converting section 150 calculates the amount of ink enough to print which is obtained by subtracting the used amount of printing from the purchased amount of printing (hereinafter referred to as the possible amount of printing). The print driving signal converting section 150 calculates a credit corresponding to the number of shots for the possible amount of printing based on the calculated possible amount of printing and decides that the credit is an appropriate credit to be read from the advance payment information storage section 58 (S100). Hereinafter, the credit calculated in the step S100 is 1000.

The print driving signal converting section 150 judges whether the advance payment information storage section 58 is attached to the cartridge 50 (S110). When the print driving signal converting section 150 causes the advance payment information reading/writing section 120 to read the remaining credit stored in the advance payment information storage section 58, and the advance payment information reading/writing section 120 can read the remaining credit, the print driving signal converting section 150 judges that the advance payment information storage section 58 is attached to the cartridge 50.

Judging that the advance payment information storage section 58 is attached to the cartridge 50 in the step S110 (S110: Yes), the print driving signal converting section 150 judges whether the remaining credit stored in the advance payment information storage section 58 is information indicating that there in no advance payment (S112). For example, when the remaining credit stored in the advance payment information storage section 58 is "0", the print driving signal converting section 150 judges that there is no advance payment. Meanwhile, judging that the remaining credit is not information indicating that there is no advance payment in the S112 (s112: No), the print driving signal converting section 150 judges whether the remaining credit stored in the advance payment information storage section 58 is more than the credit "1000" calculated in the step S100 (S120).

Judging that the remaining credit stored in the advance payment information storage section 58 is more than the credit "1000" calculated in the step S100 (S120: Yes), the print driving signal converting section 150 adds the credit "1000" calculated in the step S100 to the read credit in the read advance payment information storage section 170 (S130). Additionally, the print driving signal converting section 150 subtracts the credit "1000" calculated in the step S100 from a remaining credit "2000" stored in the advance payment information storage section 58 (S140).

Here, when the read credit is not "0" but there is any remaining, the remaining is added to the credit read in the step S130 and stored. FIG. 5B indicates the read credit "1000", the used credit "0 (initial value)" and the settled credit "0 (initial value)" stored in the read advance payment information storage section 170, and the purchase credit "3000" and the remaining credit "1000" stored in the advance payment information storage section 58 at the end of the step S130.

The print control section 130 outputs a print driving signal for the first page to the printing section 140 based on a print job. The printing section 140 prints by using the ink in the cartridges 50, 60, 70 and 80 based on the print driving signal (S160). Here, the print driving signal includes a signal for the head shot that controls an ink jet head, for example.

The print control section 130 updates the used amount of printing stored in the ink information storage section 56 in accordance with the print driving signal required for printing the first page (S170). For example, the print control section 130 converts the number of head shots to the amount of printing after outputting the signal for the head shots on the first page, and updates the used amount of printing stored in the ink information storage section 56. Alternatively, the print control section 130 may update the used amount of printing stored in the ink information storage section 56 every time the signal for the head shot is outputted.

The print driving signal converting section 150 stores the used credit as accounting information for the printing on the first page in the read advance payment information storage section 170 (S180). Specifically, the print driving signal converting section 150 firstly acquires the signal for the head shots required for printing on the first page outputted by the print control section 130 in the step 160, and calculates the number of head shots required for printing the first page. The print driving signal converting section 150 converts the calculated number of head shots to the used credit "20" for the first page, adds the converted used credit to the read advance payment information storage section 170 and stores the same in the read advance payment information storage section 170.

The settlement section 160 settles the read credit "1000" stored in the read advance payment information section 170 by the used credit "20" (S190). FIG. 5C shows the read credit "1000", the used credit "20" and a settled credit "980" which are stored in the read advance payment information storage section 170 at the end of the step 3 S190. Here, the purchase credit and the remaining credit stored in the advance payment information storage section 58 are not updated.

The print driving signal converting section 150 judges whether the settled credit stored in the read advance payment information storage section 170 is less than "0" (S192).

Judging that the settled credit stored in the read advance payment information storage section 170 is not less than "0" (S192: No), the print driving signal converting section 150 notifies the print control section 130 of that effect.

Receiving the notification, the print control section 130 judges whether the printing of the print job is completed (S200). Meanwhile, judging that the printing of the print job is not completed in the step 200 (S200: No), return to the step S160. Here, as for the following page, converting the used credit for the following page to "10" for example, the print driving signal converting section 150 adds the used credit "10" for the following page to the used credit "20" stored in the read advance payment information storage section 170 and stores the same (S180). Then, the settlement section 160 settles the read credit "1000" stored in the read advance payment information storage section 170 by the added used credit "30" (S190). FIG. 5D shows the read credit "1000", the used credit "30" and the settled credit "970" which are stored in the read advance payment information storage section 170 at the end of the step 190 for the printing on the second page. Here, the purchase credit and the remaining credit stored in the advance payment information storage section 58 are not updated.

Meanwhile, judging that the printing of the print job is completed in the step S200 (S200: Yes), the print control section 130 notifies the print driving signal converting section 150 of that effect. Receiving the notification, the print driving signal converting section 150 firstly reads the settled credit "970" stored in the read advance payment information storage section 170. The print driving signal converting section 150 adds the read settled credit "970" to the remaining credit "1000" stored in the advance payment information storage section 58 (S210). Additionally, the print driving signal converting section 150 initializes the read credit, the used credit and the settled credit stored in the read advance payment information stored in the read advance payment information storage section 170 to "0" (S210). Then, the flowchart is ended. Thereby the charge can be easily collected before using the printer. Particularly, the charge can be easily collected without using a card or the like because the advance payment information storage section 58 is attached to the cartridge body 52 of the cartridge 50. Further, the charge can be easily collected in accordance with the amount of using ink. FIG. 5E shows a purchase credit "3000" and a remaining credit "1970" stored in the advance payment information storage section 58 at the end of the step S210. Here, the read credit, the used credit and the settled credit stored in the read advance payment information storage section 170 have been initialized.

Meanwhile, judging that the advance payment information storage section 58 is not attached to the cartridge 50 in the step S110 (S110: No), the print driving signal converting section 150 notifies the display section 180 of that effect through the advance payment information reading/writing section 120 (S230). Receiving the notification, the display section 180 displays that effect on the display 14. Then, the flowchart is ended. Thereby when the charge is not paid before using the printer, any printing can be prevented from being performed. In the same way, judging that the remaining credit is "0" in the step S112 (S112: Yes), the print driving signal converting section 150 notifies the display section 180 of that effect through the advance payment information reading/writing section 120 (S230). Receiving the notification, the display section 180 displays that effect on the display 14. Then, the flowchart is ended. Thereby when a predetermined charge is not paid before using the printer 30, or when the paid charge is consumed because of using the printer 30, any printing can be prevented from being performed.

Meanwhile, judging that the remaining credit stored in the advance payment information storage section 58 is not more than the credit "1000" calculated in the step S100 (S120: No), the print driving signal converting section 150 notifies the display section 180 of that effect through the advance payment information reading/writing section 120 (S220). Receiving the notification, the display section 180 displays that effect on the display 14. Then, the flowchart is ended. Thereby when the paid charge is consumed because of using the printer 30, any printing can be prevented from being performed.

Meanwhile, judging that the settled credit stored in the advance payment information storage section 170 in the step 192 is less than "0" (S192: Yes), the print driving signal converting section 150 notifies the display section 180 of that effect through the advance payment information reading/writing section 120 (S240). Receiving the notification, the display section 180 displays information indicating that the credit is not enough to continue to print on the display 14. The print driving signal converting section 150 notifies the print control signal converting section 150 of that effect. Receiving the notification, the print driving signal converting section 150 initializes the read credit, the used credit and the settled credit stored in the read advance payment information storage section 170 to "0". Then, the flowchart is ended.

Figure 6:
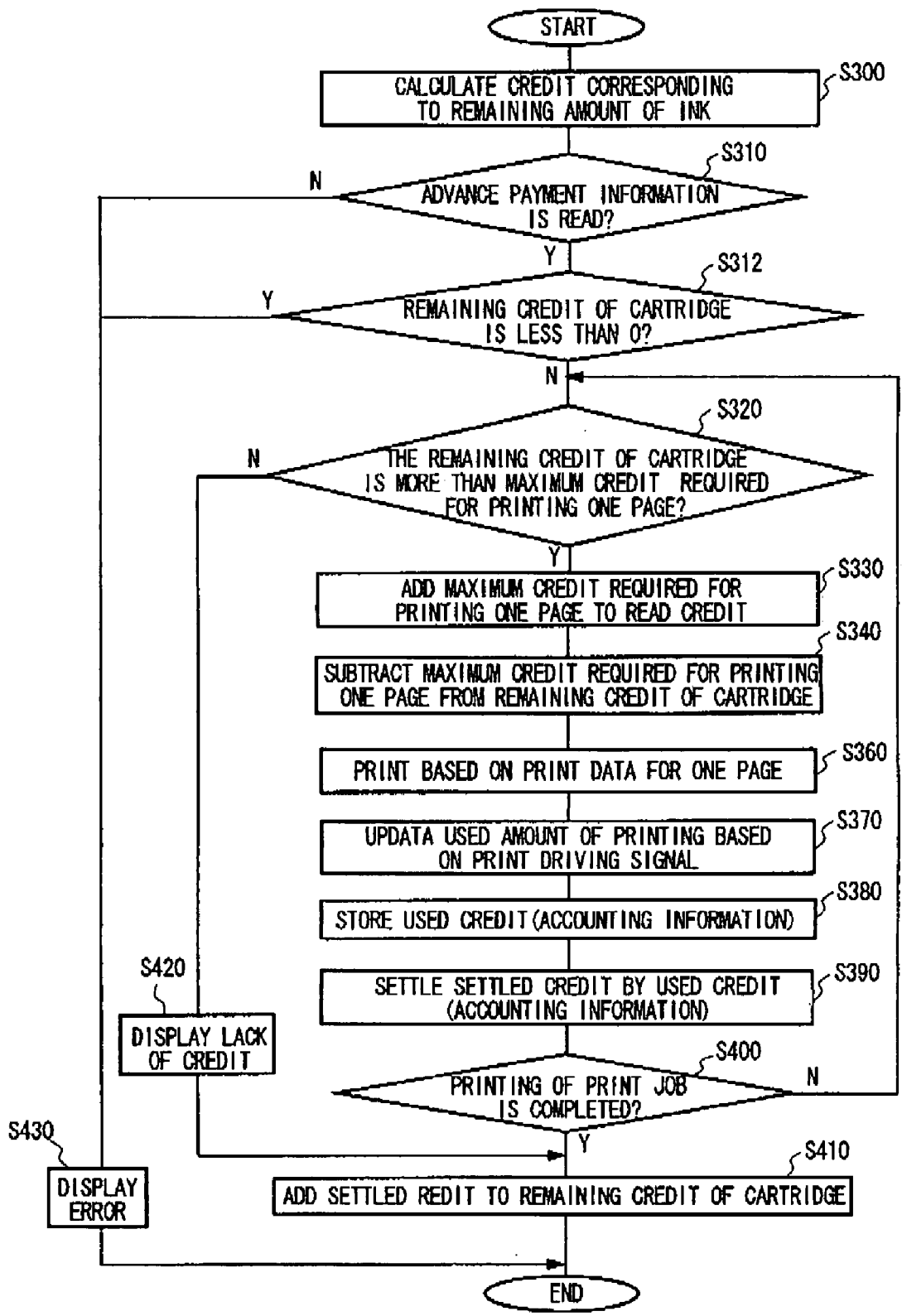
FIG. 6 is a flowchart showing another example of operation of the printer 30

FIG. 6 is a flowchart showing another example of operation of the printer 30. FIG. 7 is a schematic block diagram showing credits in the advance payment information storage section 58 and the read advance payment information storage section 170. The flowchart shown in FIG. 6 starts under the condition the same as that of the flowchart shown in FIG. 4. At the starting point of the flowchart shown in FIG. 6, the advance payment information storage section 58 stores therein the purchase credit "3000" and the remaining credit "2000", and the read advance payment information storage section 170 of the printer 30 stores the read credit "0", the used credit "0" and the settled credit "0" as the initial value. Here, the steps the same as those of the flowchart shown in FIG. 4 is not repeatedly described in detail.

The print driving signal converting section 150 calculates an appropriate credit to be read from the advance payment information storage section 58 based on the possible amount of printing calculated (S300). Hereinafter, the calculated appropriate credit to be read is 1000. The print driving signal converting section 150 judges whether the advance payment information storage section 58 is attached to the cartridge 50 (S310).

Judging that the advance payment information storage section 58 is attached to the cartridge 50 in the step S310 (S310: Yes), the print driving signal converting section 150 judges whether the remaining credit stored in the advance payment information storage section 58 is "0" (S312). Judging that the remaining credit stored in the advance payment information storage section 58 is not "0" in the step S312 (S312: No), the print driving signal converting section 150 judges whether the remaining credit stored in the advance payment information storage section 58 is more than the maximum credit required for printing one page (S320). Here, the maximum credit required for printing one page is previously defined as the amount of printing for printing by ejecting ink over all one page. Here, the maximum credit required for printing one page is 100.

Judging that the remaining credit stored in the advance payment information storage section 58 is more than the maximum credit "100" required for printing one page (S320: Yes), the print driving signal converting section 150 adds the maximum credit "100" required for printing one page to the read credit (S330). Additionally, the print driving signal converting section 150 subtracts the maximum credit "100" required for printing one page from the remaining credit "200" stored in the advance payment information storage section 58 through the advance payment information reading/writing section 120 (S340). FIG. 7B shows the read credit "100", the used credit "0" and the settled credit "0" which are stored in the advance payment information storage section 170, and the purchase credit "3000" and the remaining credit "1900" stored in the advance payment information storage section 58 at the end of the step S330.

The printing section 140 prints by using ink in the cartridges 50, 60, 70 and 80 based on a print driving signal (S360). The print control section 130 updates the used amount of printing stored in the ink information storage section 56 in accordance with the print driving signal for printing the first page (S370). The print driving signal converting section 150 adds the used credit "20" as accounting information on the printing of the first page to the read advance payment information storage section 170 and stores the same (S380). The settlement section 160 settles the read credit "100" stored in the read advance payment information storage section 170 by the used credit "20" (S390). FIG. 7C shows the read credit "100", the used credit "20" and the settled credit "80" which are stored in the read advance payment information storage section 170 at the end of the step 390. Here, the purchase credit and the remaining credit stored in the advance payment information storage section 58 are not updated.

The print control section 130 judges whether the printing of the print job is completed (S400). Judging that the printing of the print job is not completed in the step S400 (S400: Yes), return to the step S320. FIG. 7D shows the read credit "200", the used credit "30" and the settled credit "170" stored in the read advance payment information storage section 170 and the purchase credit "3000" and the remaining credit "1800" stored in the advance payment information storage section 58 at the end of the step S390 for printing the second page (where, the used credit is "10").

Meanwhile, when the print control section 130 judges that the printing of the print job is completed in the step S400 (S400: Yes), the print driving signal converting section 150 adds the settled credit "170" to the remaining credit "1800" stored in the advance payment information storage section 58 (S410). Additionally, the print driving signal converting section 150 initializes the read credit, the used credit and the settled credit stored in the read advance payment information storage section 170 to "0". Then the flowchart is ended. FIG. 7E shows the purchase credit "3000" and the remaining credit "1970" stored in the advance payment information storage section 58 at the end of the step 410. Here, the read credit, the used credit and the settled credit stored in the read advance payment information storage section 170 have been initialized.

An operation in the case that the print driving signal converting section 150 judges that the advance payment information storage section 58 is not attached to the cartridge 50 in the step S310 (s310: No), and an operation in the case that the print driving signal converting section 150 judges that the remaining credit is "0" in the step S312 (S312: Yes) are the same as the operation shown in FIG. 4, so that the description is omitted.

Meanwhile, when it is judged that the remaining credit stored in the advance payment information storage section 58 is not more than the maximum credit "100" required for printing one pages in the step S320 (S320: No), jump to step S410. Here, when it is judged that the remaining credit stored in the advance payment information storage section 58 is not more than the maximum credit "100" required for printing one page in the step S320 (s320: No), skip the step S410, so that the flowchart may be ended.

Moreover, the print driving signal converting section 150 may add a credit for covering the shortfall in the maximum credit "100" required for printing one page to the read advance payment information storage section 170 in the step S330. That is, the print driving signal converting section 150 may add the credit equivalent to the used credit to the read advance payment information storage section 170 in the step S330. Here, in this case, the print driving signal converting section 150 subtracts the credit added in the step S330 from the remaining credit stored in the advance payment information storage section 58. Moreover, the average credit required for printing one page may be read instead of the "maximum" credit required for printing one page, and any credit may be read for one page dependent on the mode of the page such as pictures or characters.

FIG. 8 shows an example of a display screen displayed by the display 14. The display section 180 receives from the personal computer 10 information indicating that the remaining credit and the amount of possible printing should be displayed. Receiving the information, the display section 180 acquires the remaining credit stored in the advance payment information storage section 58 and the possible amount of printing stored in the ink information storage sections 56, 66, 76 and 86 and displays the same as shown in FIG. 8. Here, the display section 180 may display only the number of remaining credit. Here, the display section 180 may display those on a display 34 of the printer 30 instead of or in addition to the display 14. Those may be displayed when the cartridge 50 is mounted on the printer 30, when the print job is inputted, when the printing of the print job is completed and when any inquiry from the user is received and so forth.

As described above, according to the present embodiment, the charge can be easily collected because the charge is previously paid. Here, the printer 30 may integrally includes a reading function in addition to the printing function. The printing function of the printer 30 includes the cartridge accommodating section 111, the advance payment information reading/writing section 120, the print control section 130, the printing section 140, the print driving signal converting section 150, the settlement section 160, the read advance payment information storage section 170 and the display section 180. The printer may perform the above-described operation by receiving a print job from not only the personal computer 10 but also the reading function. Meanwhile, a part of the above-described functions may be provided by the personal computer 10.

Hereinbefore, the inkjet printer has been described as the printer 30 in the present embodiment, however, any other type of printer may be applied. For example, the printer may be a laser-beam printer using toner as a color material. When the laser-beam printer is employed, the print driving signal converting section 150 may convert the used credit based on a driving signal outputted to a light source.

Moreover, the cartridge 50 separately includes the ink information storage section 56 and the advance payment information storage section 58 in the present embodiment as shown in FIG. 2. Alternatively, the advance payment information storage section 58 may be included in the ink information storage section 56. Thereby the charge can be easily collected by using the existing cartridge. Further, each of the cartridges 60, 70 and 80 may include the advance payment information storage section 58 in addition to the cartridge body 62, the ink supply port 64 and the ink information storage section 66.

Moreover, each of FIG. 4-FIG. 7 show the deposit system in which the credit corresponding to the amount of ink in the cartridge 50 is previously subtracted, however it is not limited to that. For example, the advance payment information reading/writing section 120 may update the advance payment information in the advance payment information storage section 58 for each head-shot or every time the number of headshots reaches the number corresponding a certain credit.

Figure 9:
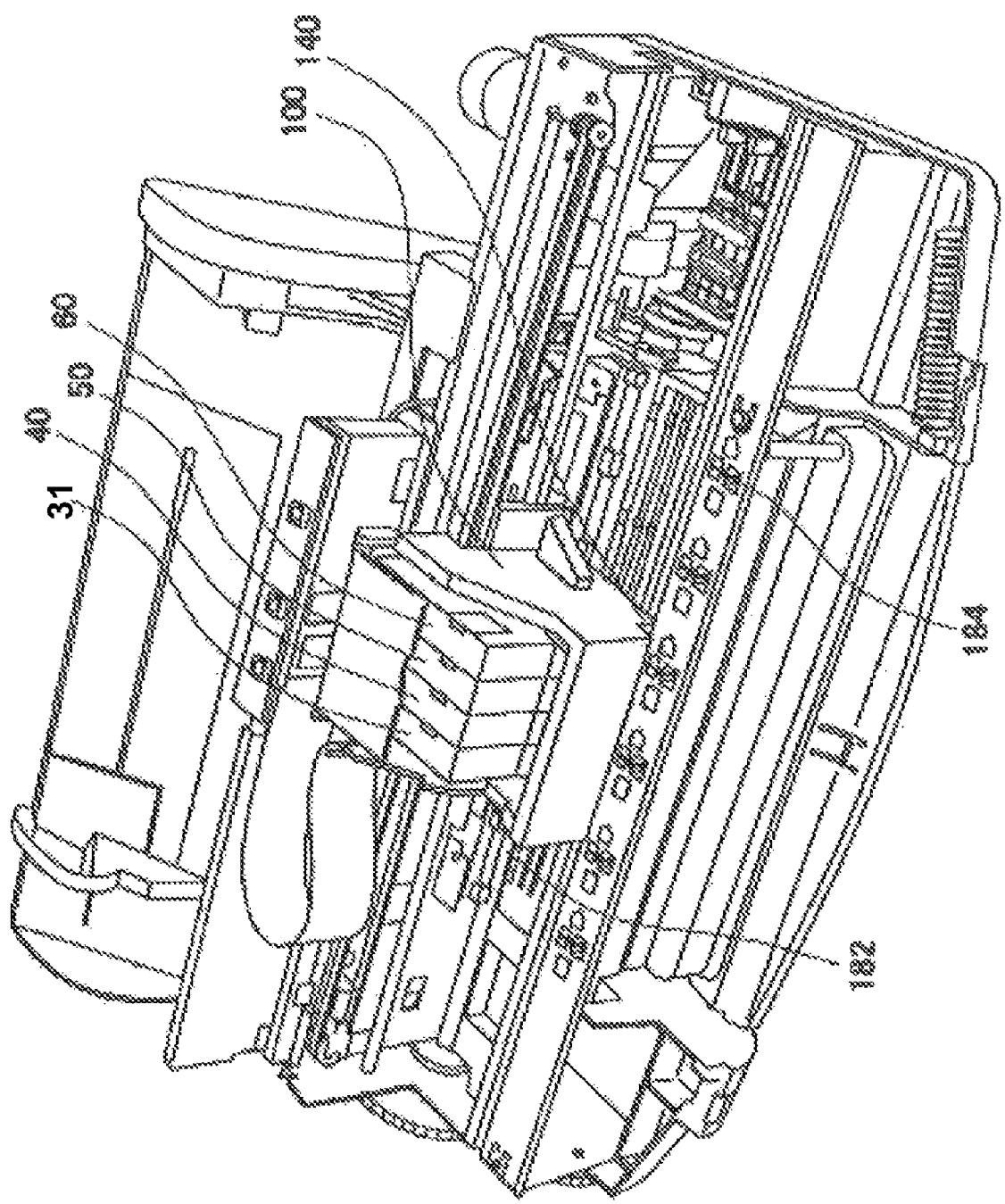
FIG. 9 shows a schematic perspective view showing the printer 30.

FIG. 9 shows a schematic perspective view of a printer 30. The printer 30 includes a conveying section 182 that conveys a medium, a discharging section 184 that discharges the medium, a print head 140 and a carriage that holds the print head 140. The carriage 100 accommodates ink cartridges 31, 40, 50 and 60. The ink cartridges 31, 40, 50 and 60 contain black, cyan, magenta and yellow of color materials. A print head 14 that ejects ink fed from each of the ink cartridges 31, 40, 50 and 60 is placed on the bottom surface of the cartridge 100.

Figure 10:
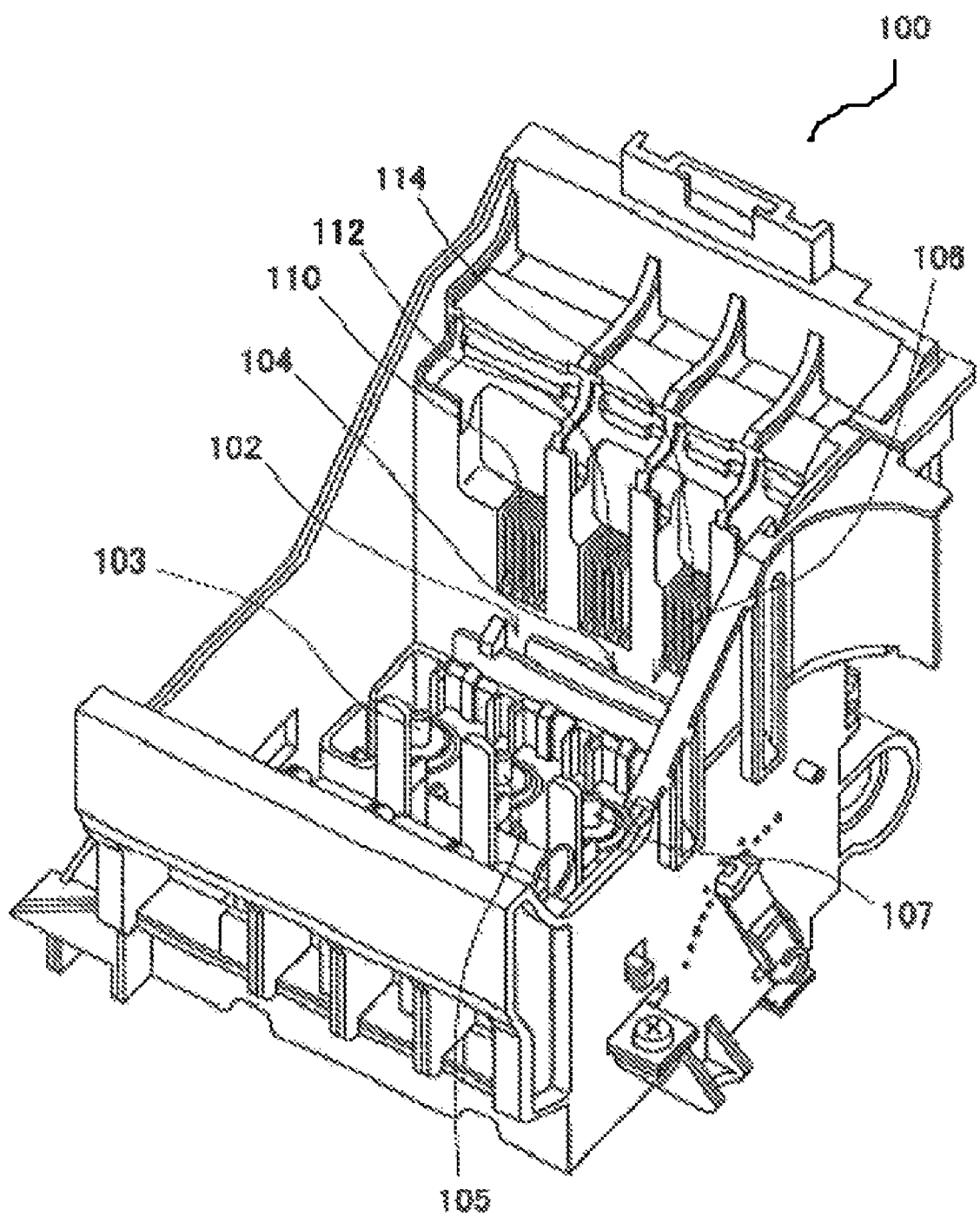
FIG. 10 is an upper front perspective view showing the carriage 100.
Figure 11:
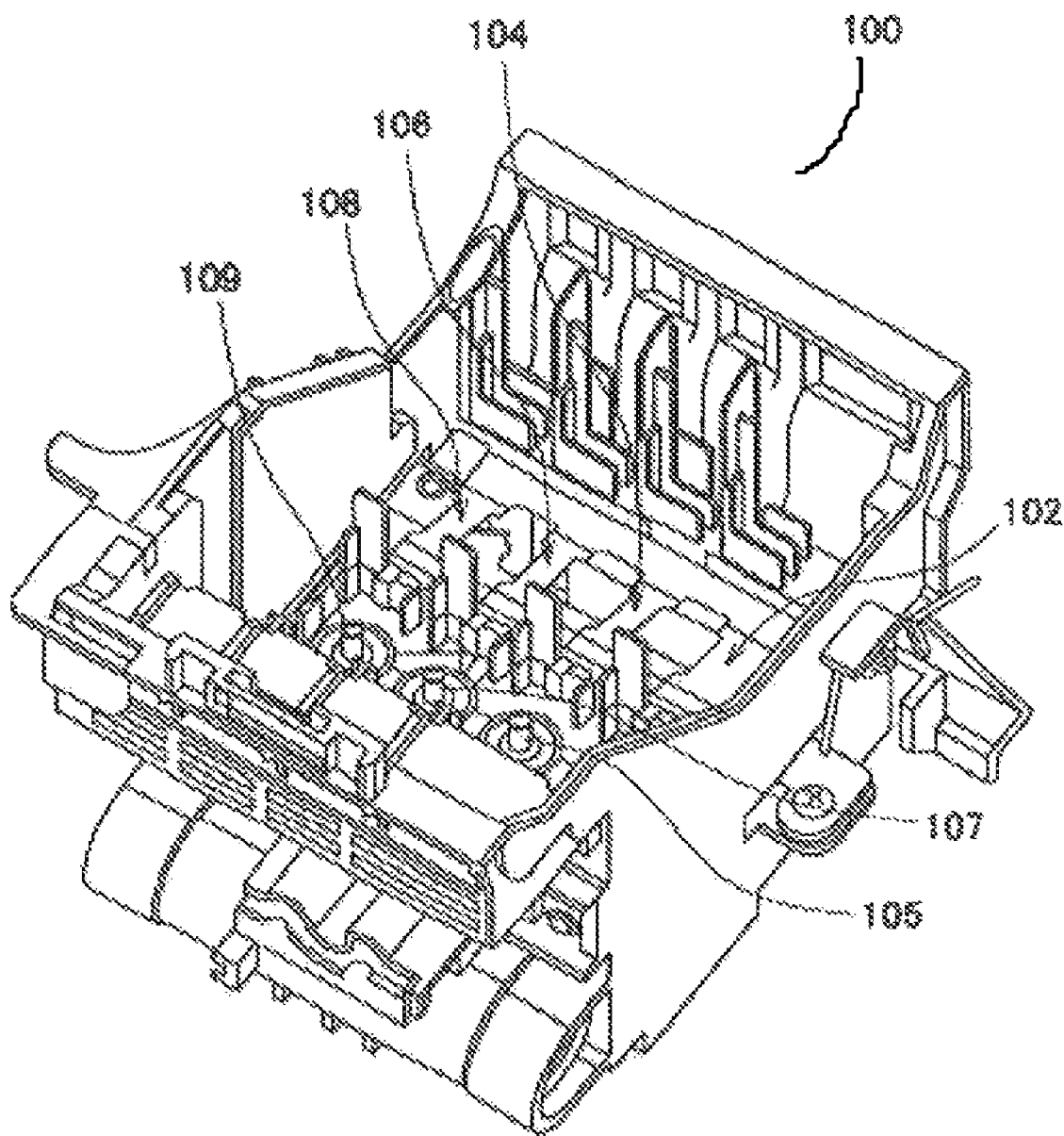
FIG. 11 is an upper back perspective view showing the carriage 100.
Figure 12:
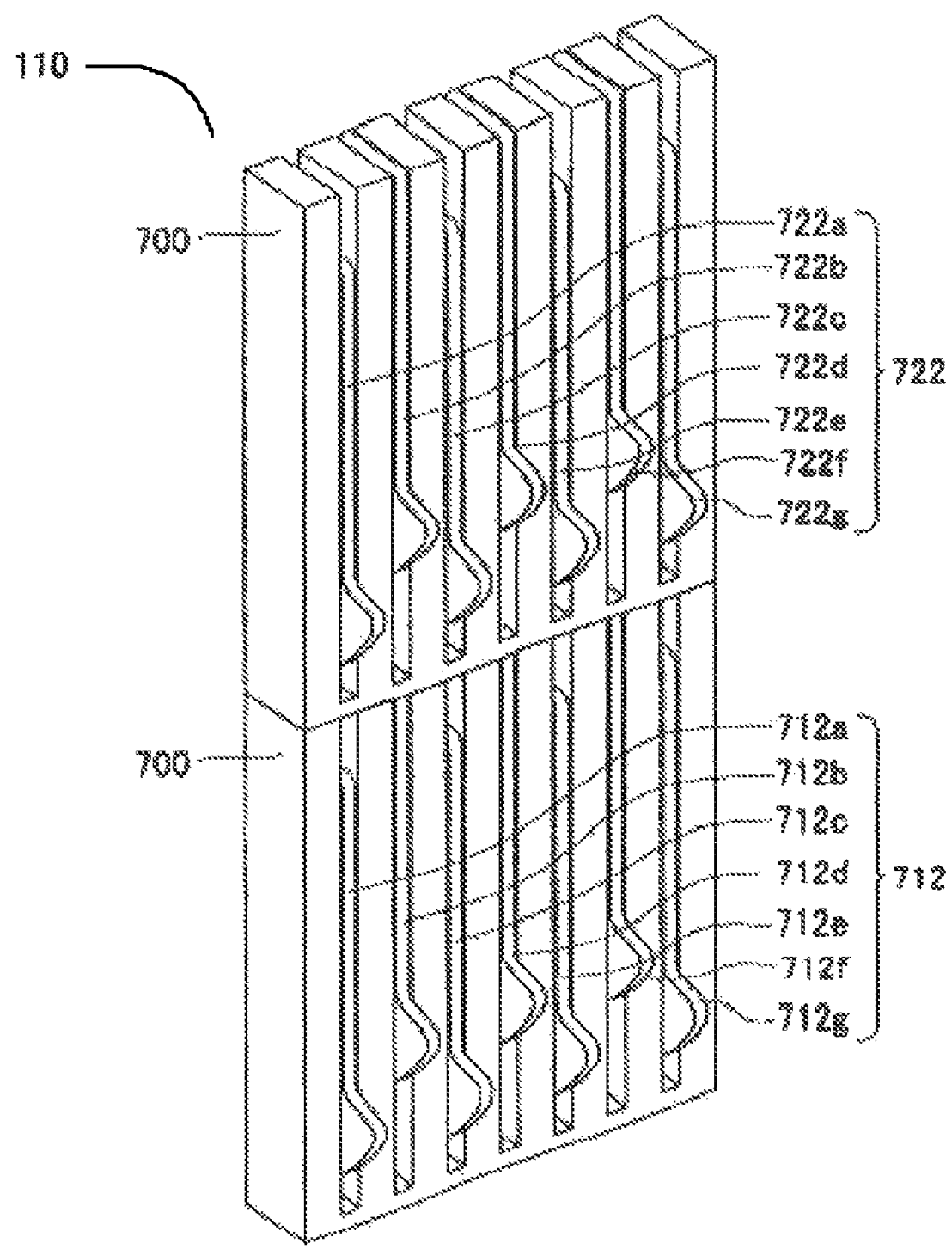
FIG. 12 is schematic perspective view showing a connecting terminal 110 included in the carriage 100.

FIG. 10 is an upper front perspective view of the carriage 100. FIG. 11 shows an upper back perspective view of the carriage 100. FIG. 12 is a schematic perspective view of a connecting terminal 110 included in the carriage 100. The carriage 100 has substantially a rectangular solid shape as a whole and its upper surface is opened as shown in FIG. 10 and FIG. 11. The carriage 100 includes cartridge accommodating sections 102, 104, 106 and 108 that accommodate the ink cartridges 31, 40, 50 and 60, ink supply sections 103, 105, 107 and 109 which are corresponding to the ink cartridges 31, 40, 50 and 60, respectively and connecting terminals 110, 112, 114 and 116. Here, the connecting terminal 116 is not shown in FIG. 10 and FIG. 11. The connecting terminal 110 includes a conductor sections 712 and 722, and a insulator section 700 as shown in FIG. 12. In FIG. 12, the connecting terminal 110 has a set of seven conductor sections 712a, b, c, d, e, f and g, and a set of seven conductor sections 722a, b, c, d, e, f and g. Those conductor sections are insulated from each other by the insulator section 700.

Figure 13:
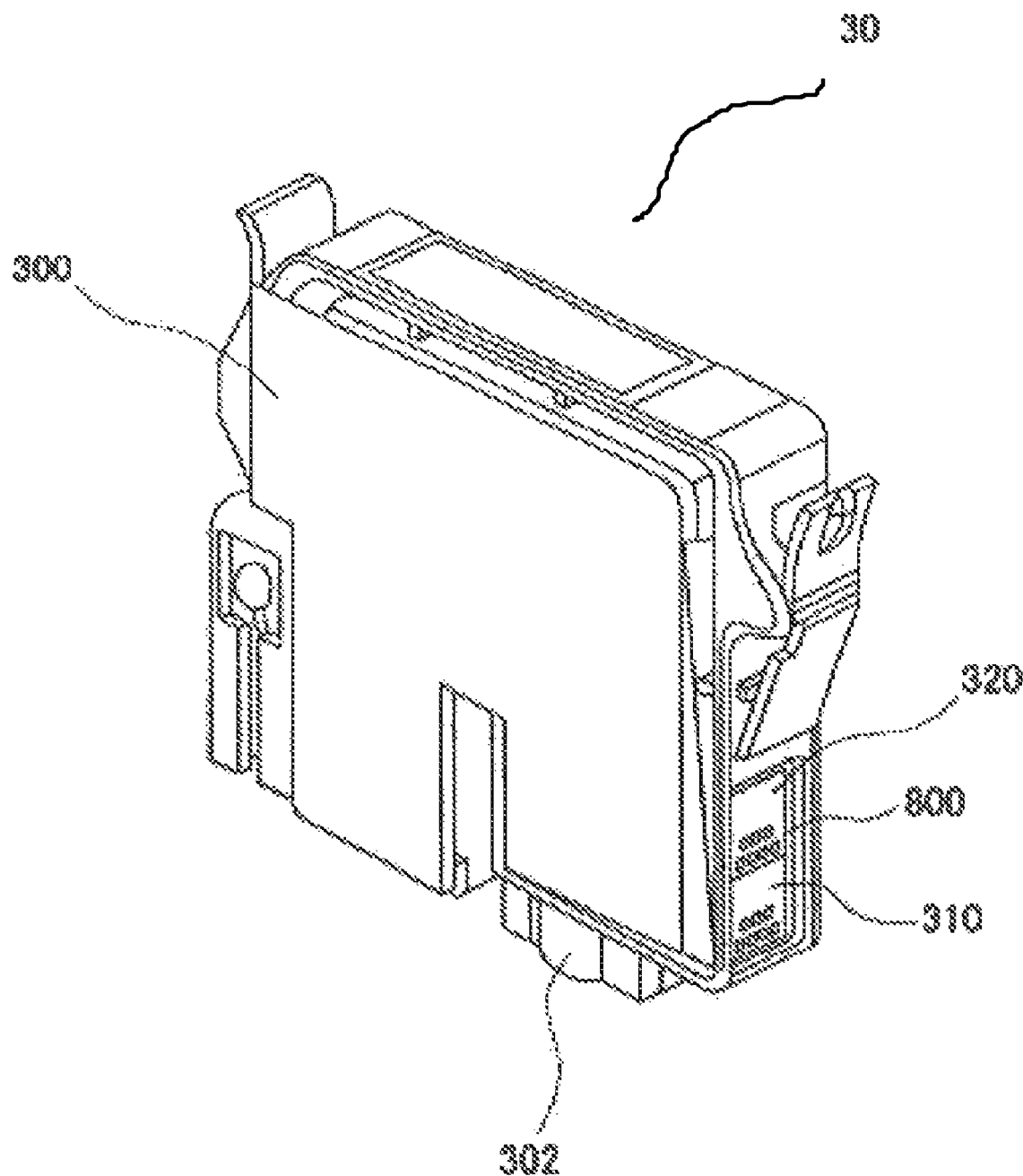
FIG. 13 is a schematic perspective view showing an example of the ink cartridge 31.

FIG. 13 is a schematic perspective view showing an example of the ink cartridge 31. The ink cartridge 31 includes a cartridge body 300 that contains ink, an ink supply port 302 that supplies ink to the ink supply section 103 of the printer 30, an ink information storage section 310 that stores therein information on ink, an advance payment information storage section 320 that stores therein advance payment information and a chip accommodating section 800 that accommodates the ink information storage section 310 and the advance payment information storage section 320. Each of the ink information storage section 310 and the advance payment information storage section 320 is, for example, an IC chip including a connecting terminal in electrically contact with the connecting terminal 110 included in the carriage 100 and a memory electrically connecting to the contact terminal that stores therein the information on ink or the advance payment information. The ink information storage section 310 and the advance payment information storage section 320 will be described later with reference to FIG. 14.

The ink information storage section 310 stores therein information on the amount of ink as the information on ink. For example, the ink information storage section 310 stores the amount of ink when the cartridge is purchased and the amount of ink used. The ink information storage section 310 may further store information on the color of ink as the information on ink. Additionally, the ink information storage section 310 may be removably attached to the chip accommodating section 800.

The advance payment information storage section 320 stores therein a credit which is advance payment information on a printing (Hereinafter a credit stored in the advance payment information storage section is referred to as an "IC credit"). The advance payment information on a printing may be information indicating that the charge corresponding to the amount for driving the printer 30 is paid in advance, and information indicating that the fee corresponding to the amount of using the ink in the cartridge 31 is paid in advance. Further, the amount of driving the printer 30 may be the number of shots of the print head 14. Additionally, the amount of driving the printer may be the pulse number when the printer is a laser printer. For example, the advance payment information storage section 320 stores therein the IC credit which can be currently used obtained by subtracting the accumulating total of the IC credit consumed because of using the printer 30 from the IC credit corresponding to the amount of money previously paid by a user as the charge of the printer 30. Moreover, the advance payment information storage section 320 may store therein identification data indicative of the validity of the IC credit in addition to the IC credit. Further, the advance payment information storage section 320 may be removably attached to the chip accommodating section 800.

Here, the other cartridges 40, 50 and 60 include cartridge bodies, ink supply ports 402, 502 and 602 that supply ink to the ink supply sections 105, 107 and 109 of the printer 30 and a chip accommodating section that accommodates the ink information storage sections 410, 510 and 610.

Figure 14:
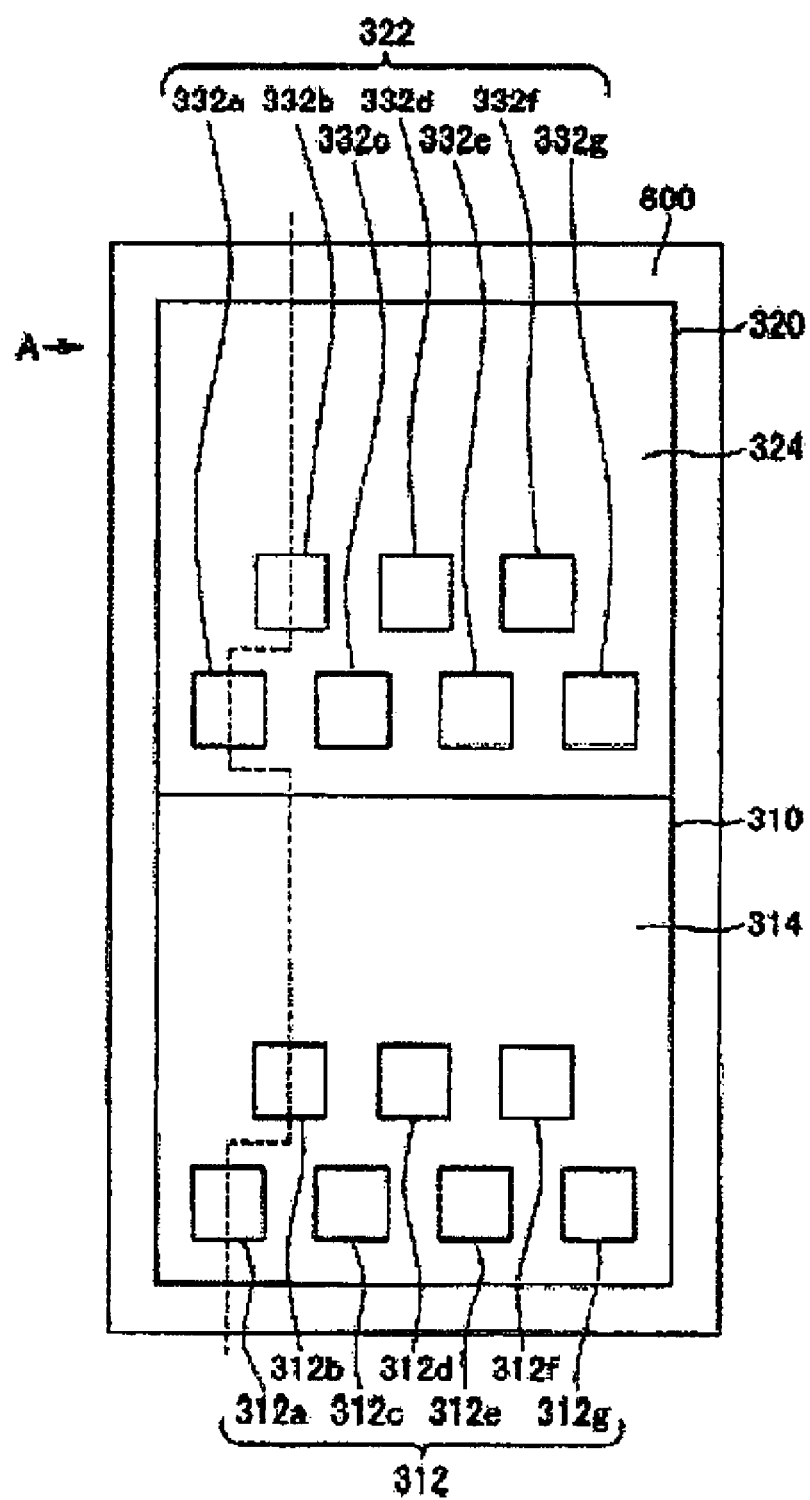
FIG. 14 is a schematic view showing the ink information storage section 310 and the advance payment information storage section 320 which are accommodated in a chip accommodating section 800.
Figure 15:
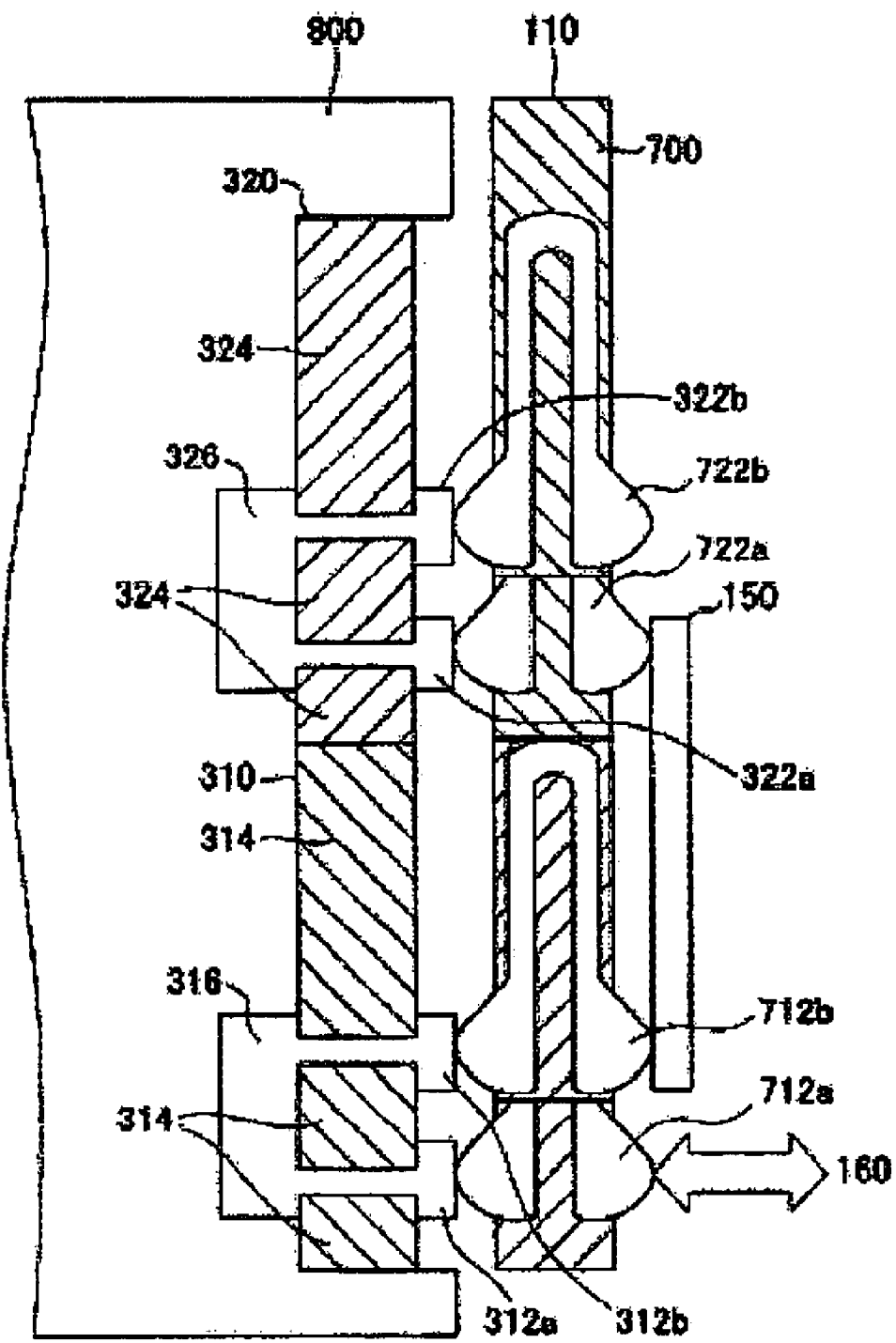
FIG. 15 is a schematic view showing an example of electrical connection between the ink information storage section 310 and the advance payment information storage section 320.
Figure 17:
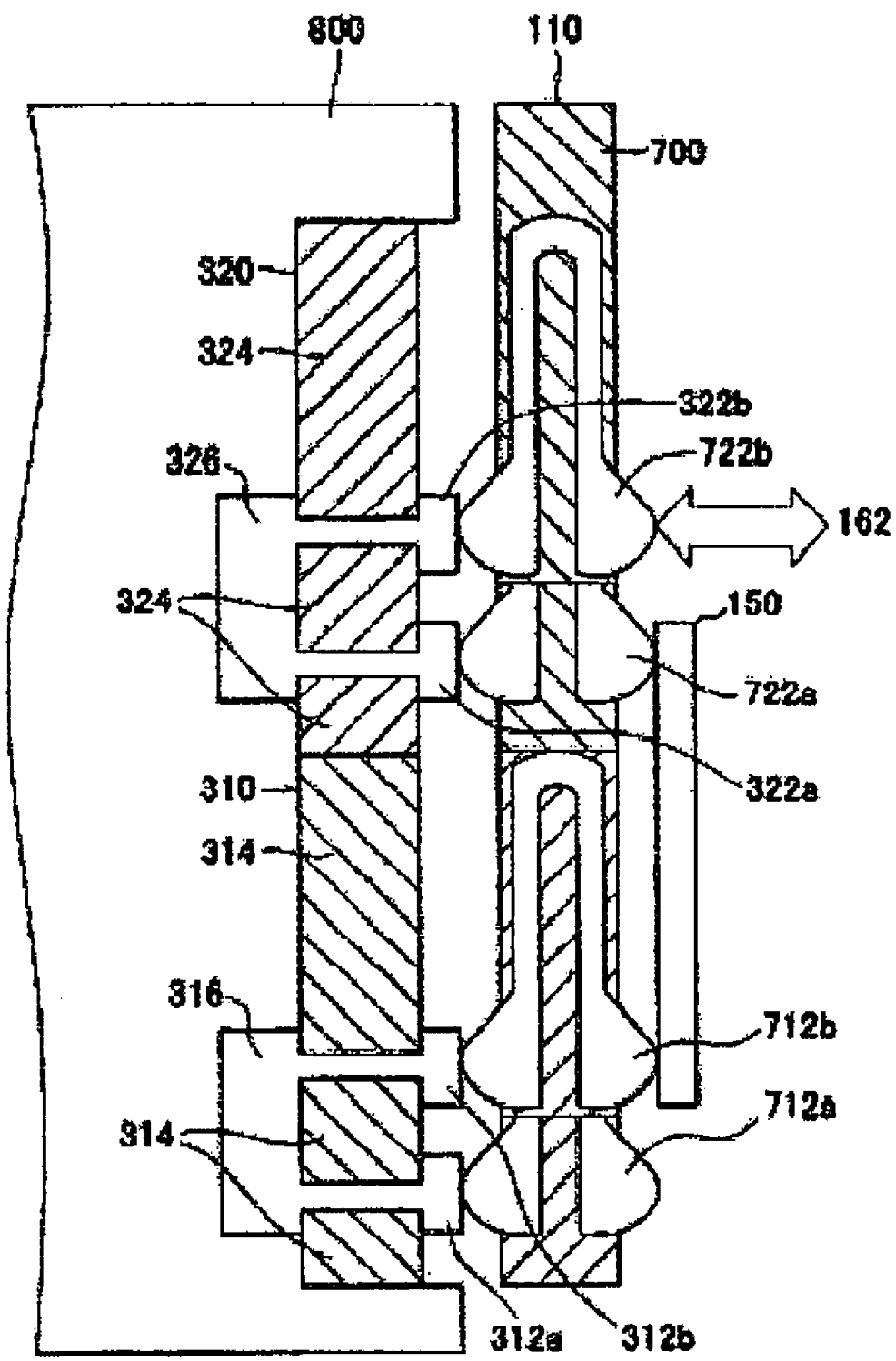
FIG. 17 shows another example of electrical connection between the ink information storage section 310 and the advance payment information storage section 320.

FIG. 14 is a schematic view of the ink information storage section 310 and the advance payment information storage section 320 which are accommodated in the chip accommodating section 800. FIG. 17 is a schematic view showing an example of electrical connection between the ink information storage section 310 and the advance payment information storage section 320. Specifically, the schematic view of FIG. 15 is a cross-sectional view in the case that the ink cartridge 31 is accommodated in the ink cartridge accommodating section 102, which obtained by cutting the ink information storage section 310 and the advance payment information storage section 320 by a broken line shown in FIG. 14 and viewing the ink information storage section 310, the advance payment information storage section 320, a connecting terminal 110 and a connecting line 150 from A direction.

The ink information storage section 310 includes a substrate 314, a connecting terminal 312 and a memory 316 that stores therein information on ink. The connecting terminal 312 is exposed on one surface of the substrate 314 opposed to the connecting terminal 110 of the carriage 100 and is penetrated through the other surface of the substrate 314. The memory 316 is disposed on the other surface of the substrate 314 and is electrically connected to the connecting terminal 312. The advance payment information storage section 320 includes a substrate 324, a connecting terminal 322 and a memory 326 that stores IC credits. The connecting terminal 322 is exposed on one surface of the substrate 324 and is penetrated through the other surface of the substrate 324. A memory 326 is disposed on the other surface of the substrate 324 and is electrically connected to the connecting terminal 322.

When the ink cartridge 31 is accommodated in the cartridge accommodating section 102, each of the connecting terminals 312a, b, c, d, e, f and g of the ink cartridge 31 is electrically connected to the opposed conductor sections 712a, b, c, d, e, f and g on the connecting terminal 110 of the carriage 100. In the same way, each of the connecting terminals 322 a, b, c, d, e, f and g of the ink cartridge 31 is electrically connected to the opposed conductor sections 722a, b, c, d, e, f and g on the connecting terminal 10 of the carriage 100.

The printer 30 further includes the connecting line 150 that electrically 5 connects the ink information storage section 310 to the advance payment information storage section 320. The connecting line 150 is electrically connected to the connecting terminal 110 of the carriage 100. For example, the connecting line 150 electrically connects the conductor section 712b and the conductor section 722a of the connecting terminal 110 each other in FIG. 15.

The connecting terminals 312a and 312b are electrically connected to the memory 316 and are electrically connected to each other through the memory 316. In the same way, the connecting terminals 322a and 322b are electrically connected to the memory 326 and are electrically connected to each other through the memory 316. Thereby when the connecting terminals electrically connect to at least one of the conductor section 712b or the conductor section 722a of the connecting terminal 110 included in the carriage 100, those can be electrically connected to the memory 316 and the memory 326.

Figure 16:
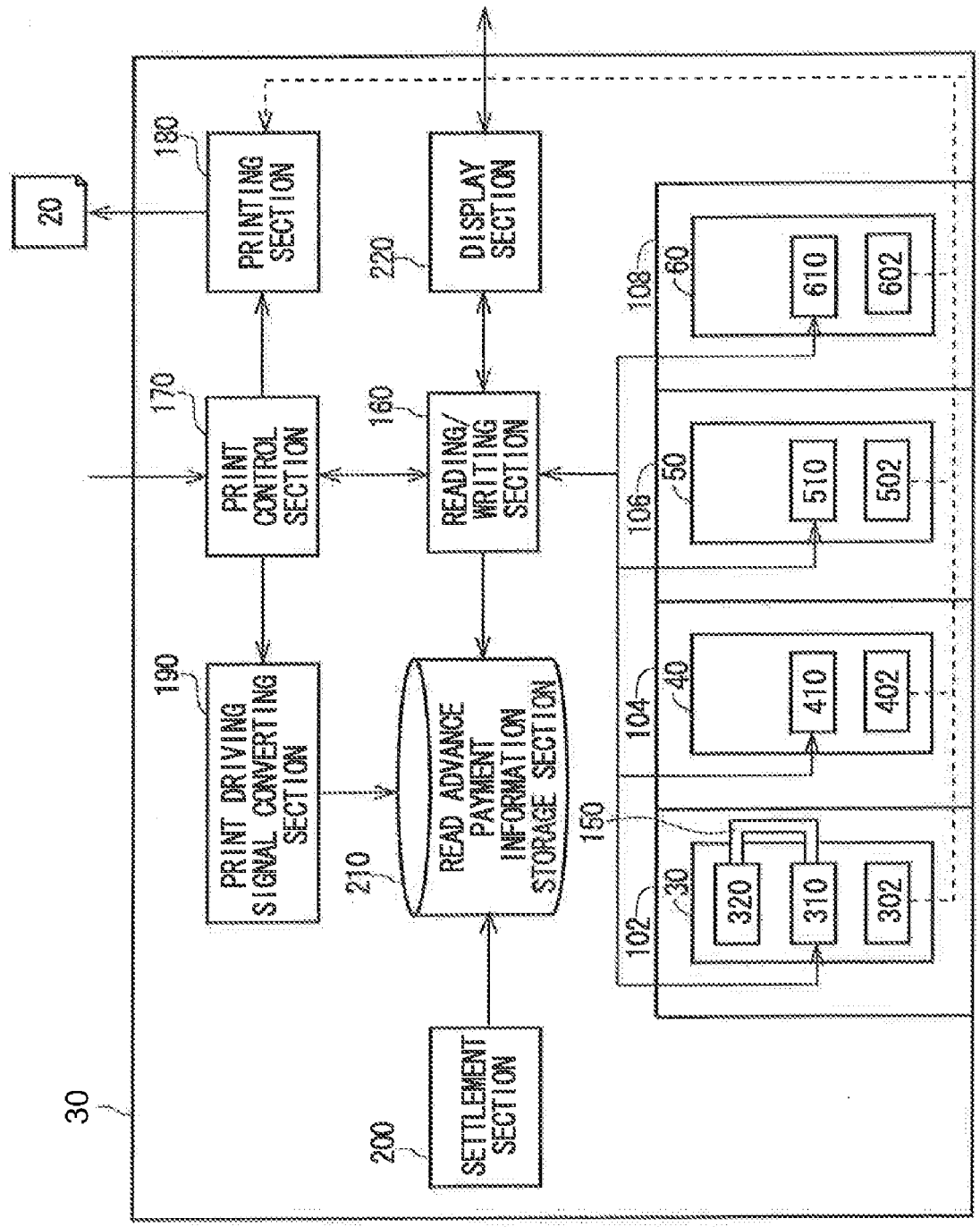
FIG. 16 is a block diagram showing an example of block configuration of the printer 30.

FIG. 16 is a block diagram showing an example of block configuration of the printer 130. The printer 130 further includes a reading/writing section 160, a print control section 170, a printing section 180, a print driving signal converting section 190, a settlement section 200, a read advance payment information storage section 210 and a display section 220 in addition to the cartridge accommodating sections 102, 104, 106 and 108, and the connecting line 150 and so forth. The block diagram of FIG. 16 shows a block configuration in the case that the reading/writing section 160 is electrically connected to the conductor section 712a as shown in FIG. 15.

The reading/writing section 160 reads/writes the information on ink stored in the memory 316 included in the ink information storage section 310 to/from the ink cartridge 31 accommodated in the cartridge accommodating section 102 through the conductor section 722a and the connecting terminal 312a. Additionally, the reading/writing section 160 reads/writes IC credits stored in the memory 326 included in the advance payment information storage section 320 through the conductor section 712a, the connecting terminal 312a, the memory 316, the conductor section 712b, the connecting line 150, the conductor section 722a and the connecting terminal 322a. Thereby a function to read/write both of the color material information and the advance payment information can be easily implemented by the connecting line 150 of the printer 30.

Moreover, the reading/writing section 160 reads/writes the information on ink stored in the memory included in the ink information storage sections 410, 510 and 610 to/from the other cartridges 40, 50 and 60 accommodated in the cartridge accommodating section 104, 106 and 108.

The read advance payment information storage section 210 stores a read credit read from the advance payment information storage section 320, a used credit consumed because of using the printer 10 and a settled credit obtained by subtracting the used credit from the read credit.

The print control section 170 accepts a print job from such as a personal computer and outputs a print driving signal for controlling to print. The print driving signal includes a signal for the head-shot that controls the print head.

The printing section 180 includes the conveying section 182 and the discharging section 184 described with reference to FIG. 9, and prints on the medium 20 in cooperation with the print head 140. In this case, the printing section 180 performs a printing by reciprocating the print head 140 on the medium 20 and ejecting ink supplied from each of the ink supply ports 302, 402, 502 and 602 while the printing section 180 causes the conveying section 182 and the discharging section 184 to drive to convey the medium 20.

The print driving signal converting section 190 converts a print driving signal to accounting information. That is, the print drive signal converting section 190 calculates a used credit as accounting information based on the print driving signal. For example, the print driving signal converting section 190 previously stores conversion information indicating that 1000 shots is equal to 1 credit.

The settlement section 200 settles the read credit stored in the read advance payment information storage section 210 by the used credit converted by the print driving signal converting section 190. The display section 220 displays such as an error message on the display 14.

Figure 18:
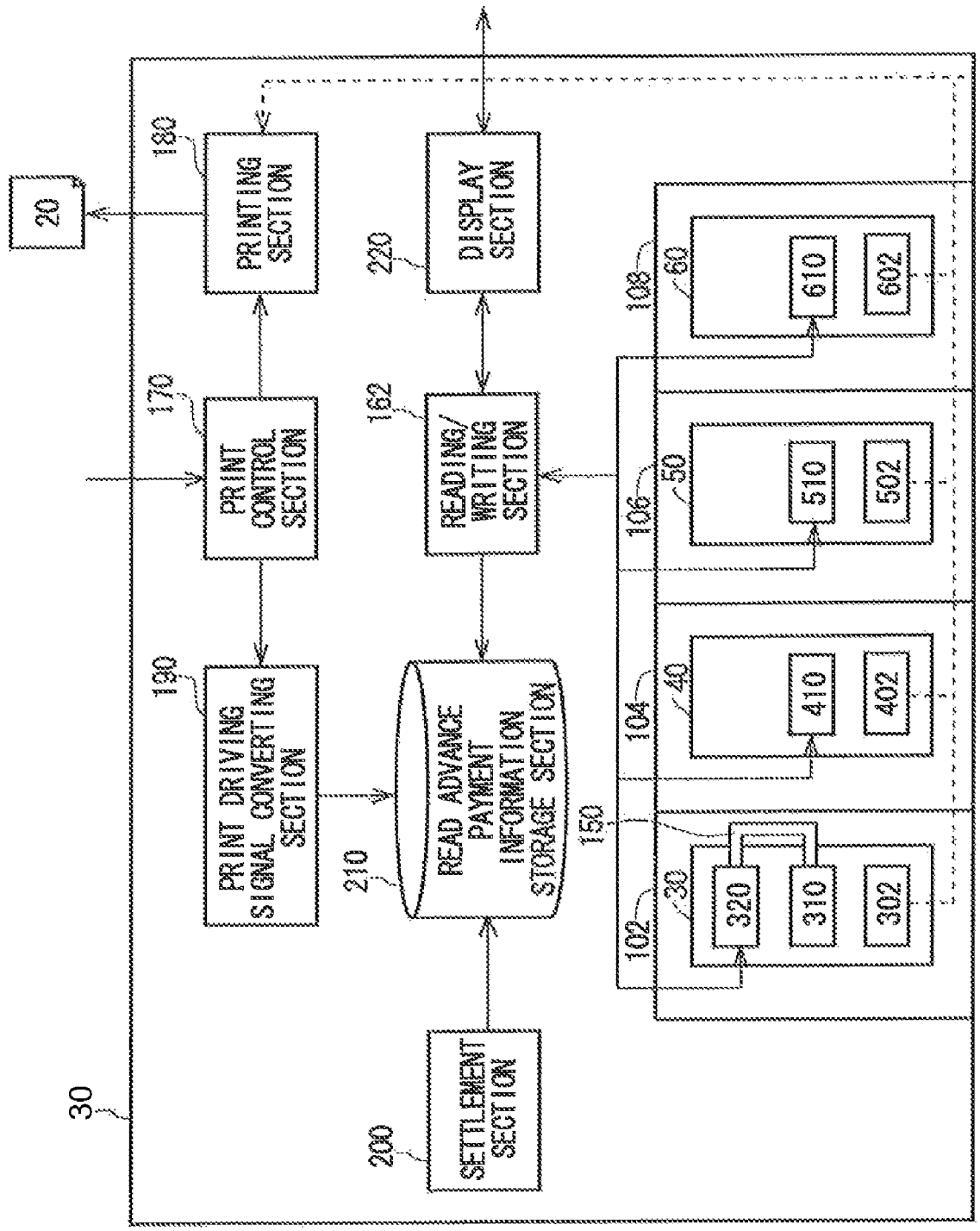
FIG. 18 is a block diagram showing another example of block configuration of the printer 30.

FIG. 17 shows another example of electrical connection between the ink information storage section 310 and the advance payment information storage section 320. FIG. 18 is a block diagram showing another example of block configuration of the printer 30. The schematic view of FIG. 17 is a cross-sectional view in the case that the ink cartridge 31 is accommodated in the cartridge accommodating section 102, which is obtained by cutting the ink information storage section 310 and the advance payment information storage section 320 by a broken line shown in FIG. 14 and viewing the ink information storage section 310, the advance payment information storage section 320, the connecting terminal 110 and the connecting line 150 from A direction as well as FIG. 14. The printer 30 shown in FIG. 18 includes a reading/writing section 162 instead of the reading/writing section 160 shown in FIG. 15. The reading/writing section 162 is electrically connected to the conductor section 722b as shown in FIG. 16.

The reading/writing section 162 is electrically connected to the conductor section 722b shown in FIG. 16 and reads/writes IC credits stored in the memory 326 included in the advance payment information storage section 320 to/from the ink cartridge 31 accommodated in the cartridge 102 through the conductor section 722b and the connecting terminal 322b. Additionally, the reading/writing section 162 is electrically connected to the conductor section 722b and reads/writes the information on ink stored in the memory 316 included in the ink information storage section 310 through the conductor section 722b, the connecting terminal 322b, the memory 326, the conductor section 722a, the connecting line 150, the conductor section 712b and the connecting terminal 312b. Thereby a function to read/write the color material information and the advance payment information can be easily implemented by the connecting line 150 of the printer 30.

Here, the reading/writing section 162 reads/writes the information on ink stored in the memory included in the ink information storage sections 410, 510 and 610 to/from the ink cartridges 40, 50 and 60 accommodated in the cartridge accommodating sections 104, 106 and 108. Additionally, each of the cartridge accommodating sections 102, 104, 106 and 108, the print control section 170, the printing section 180, the print driving signal converting section 190, the settlement section 200, the read advance payment information storage section 210 and the display section 220 is the same as each component shown in FIG. 15, so that the description is omitted.

Figure 19:
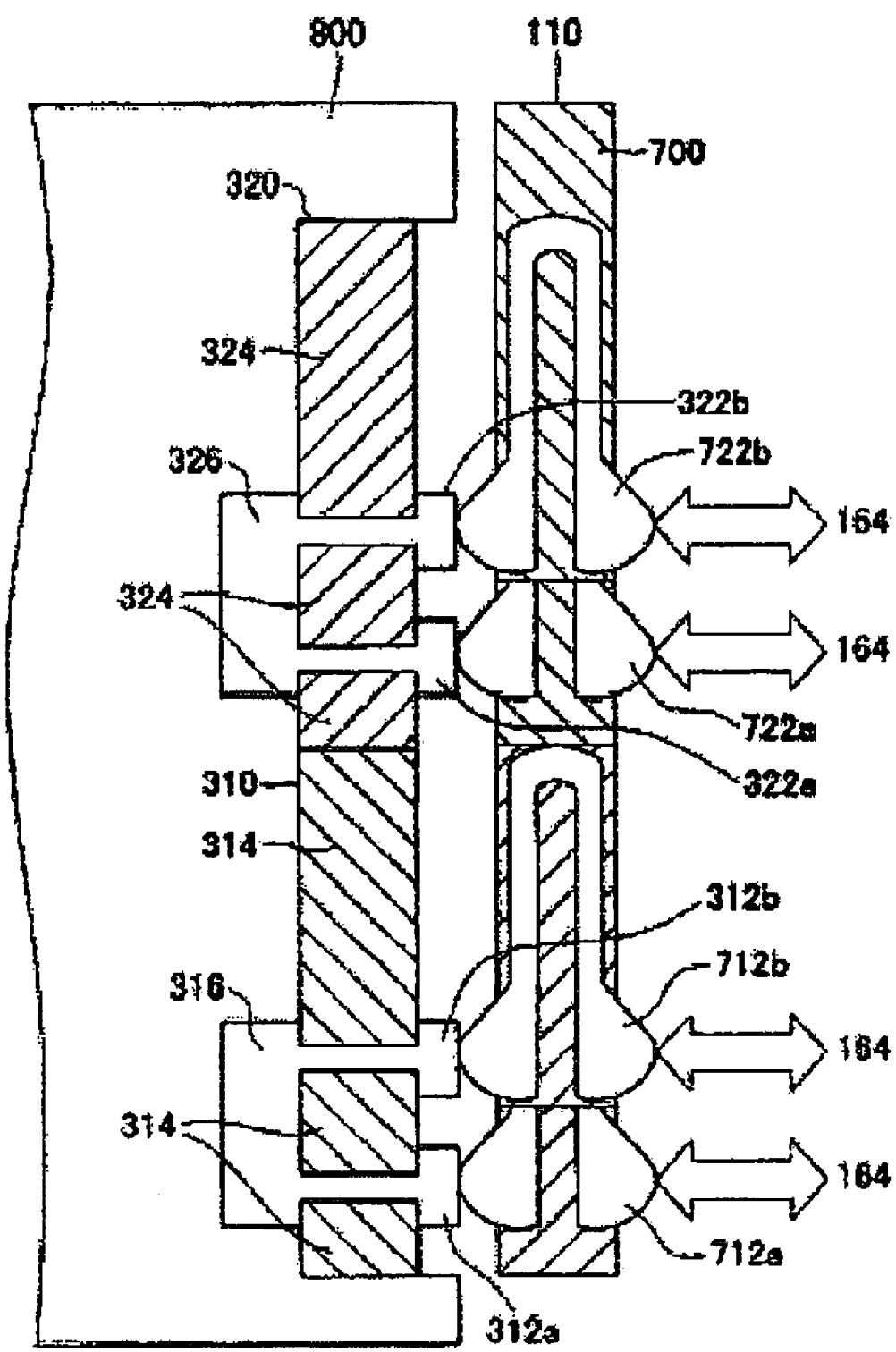
FIG. 19 is a schematic view showing further another example of electrical connection between the ink information storage section 310 and the advance payment information storage section 320.
Figure 20:
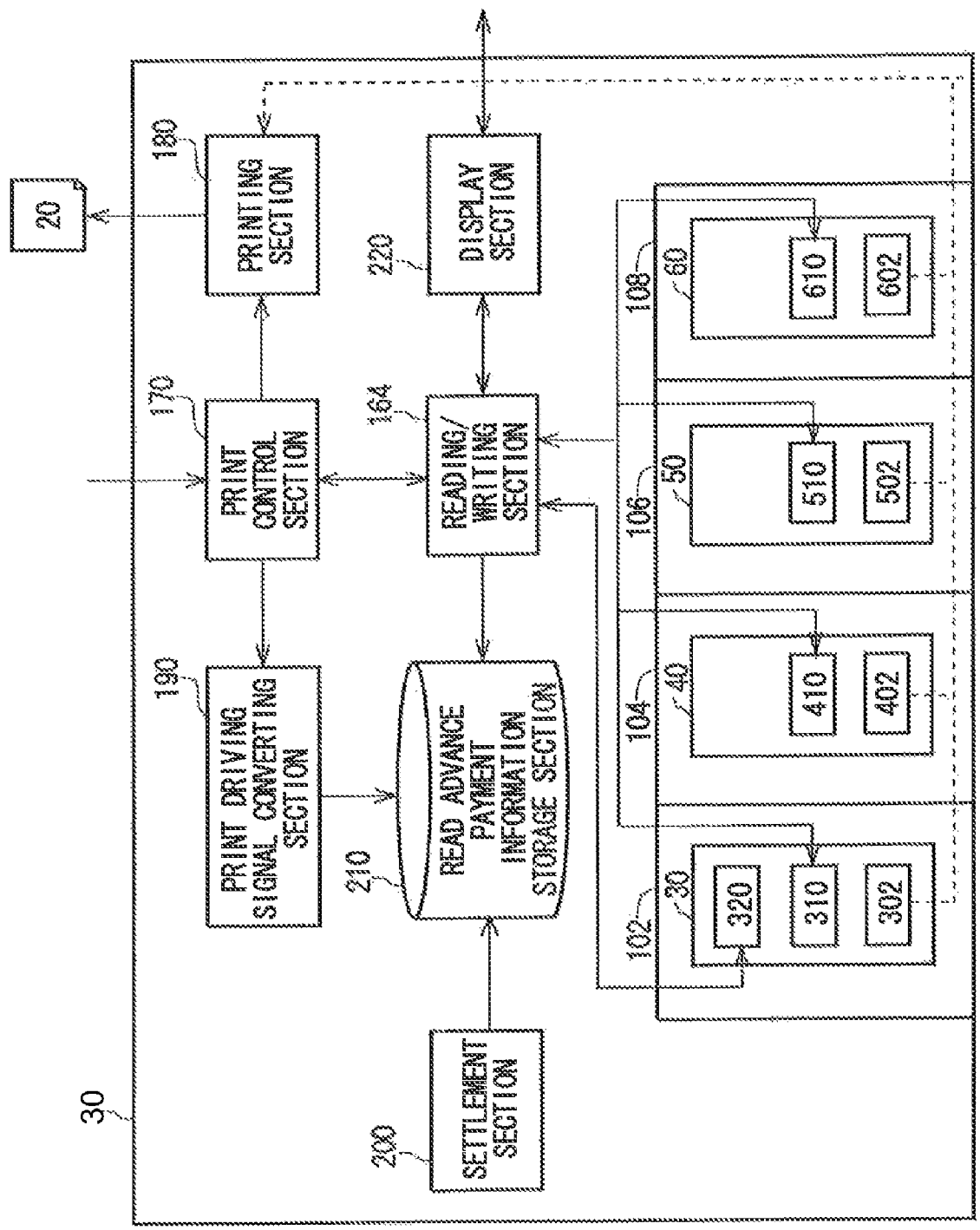
FIG. 20 is a block diagram showing further another example of block configuration of the printer 30.

FIG. 19 is a schematic view showing further another example of electrical connection between the ink information storage section 310 and the advance payment information storage section 320. FIG. 20 is a block diagram showing further another example of block configuration of the printer 30. The schematic view of FIG. 19 is a cross-sectional view in case that the ink cartridge 31 is accommodated in the cartridge accommodating section 102, which is obtained by cutting the ink information storage section 310 and the advance payment information storage section 320 by a broken line shown in FIG. 14 and viewing the ink information storage section 310, the advance payment information storage section 320, the connecting terminal 110 and the connecting line 150 from A direction as well as FIG. 15. The printer 30 shown in FIG. 20 includes a reading/writing section 164 instead of the reading/writing section 160 shown in FIG. 16 and the reading/writing section 162 shown in FIG. 18. Additionally, the printer 30 shown in FIG. 20 does not the connecting line 150 but the reading/writing section 164 is directly and electrically connected to both of the conductor section 712a and b and the conductor section 722a and b.

The reading/writing section 164 reads/writes the information on ink stored in the memory 316 included in the ink information storage section 310 to/from the ink cartridge 31 accommodated in the cartridge accommodating section 102 through the conductor section 712a and the connecting terminal 312a, or the conductor section 712b and the connecting terminal 312b. Additionally, the reading/writing section 164 reads/writes IC credits stored in the memory 326 included in the advance payment information storage section 320 through the conductor section 722a and the connecting terminal 322a, or the conductor section 722b and the connecting terminal 322b. Thereby a function to read/write the color material information and the advance payment information can be individually implemented in the printer 30.

Here, the reading/writing section 164 reads/writes the information on ink stored in the memory included in the ink information storage sections 410, 510 and 610 to/from the ink cartridges 40, 50 and 60 accommodated in the cartridge accommodating sections 104, 106 and 108, as well as the reading/writing section 160 shown in FIG. 16. Additionally, each of the cartridge accommodating sections 102, 104, 106 and 108, the print control section 170, the printing section 180, the print driving signal converting section 190, the settlement section 200, the read advance payment information storage section 210 and the display section 220 is the same as each component shown in FIG. 16, so that the description is omitted.

Figure 21:
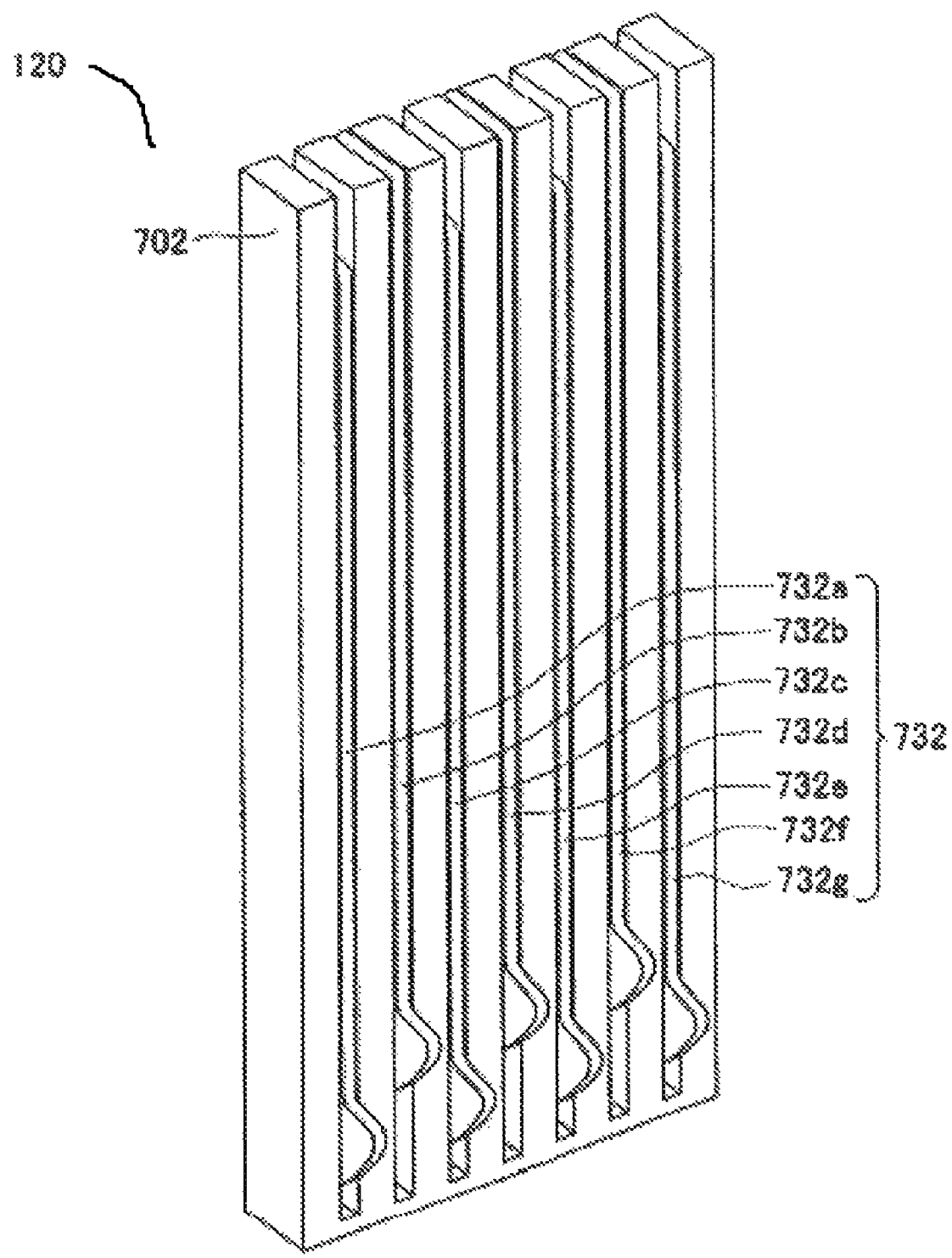
FIG. 21 is a schematic perspective view of a connecting terminal 120 included in the carriage 100.

FIG. 21 is a schematic perspective view of the connecting terminal 120 included in the carriage 100. The carriage 100 may include a connecting terminal 120 instead of the connecting terminal 110 shown in FIG. 12. The connecting terminal 120 has a conductor section 732 and an insulator section 702 as shown in FIG. 21. In the embodiment shown in FIG. 21, seven conductor sections 732a, b, c, d, e, f and g are insulated from each other by the insulator section 720.

Figure 22:
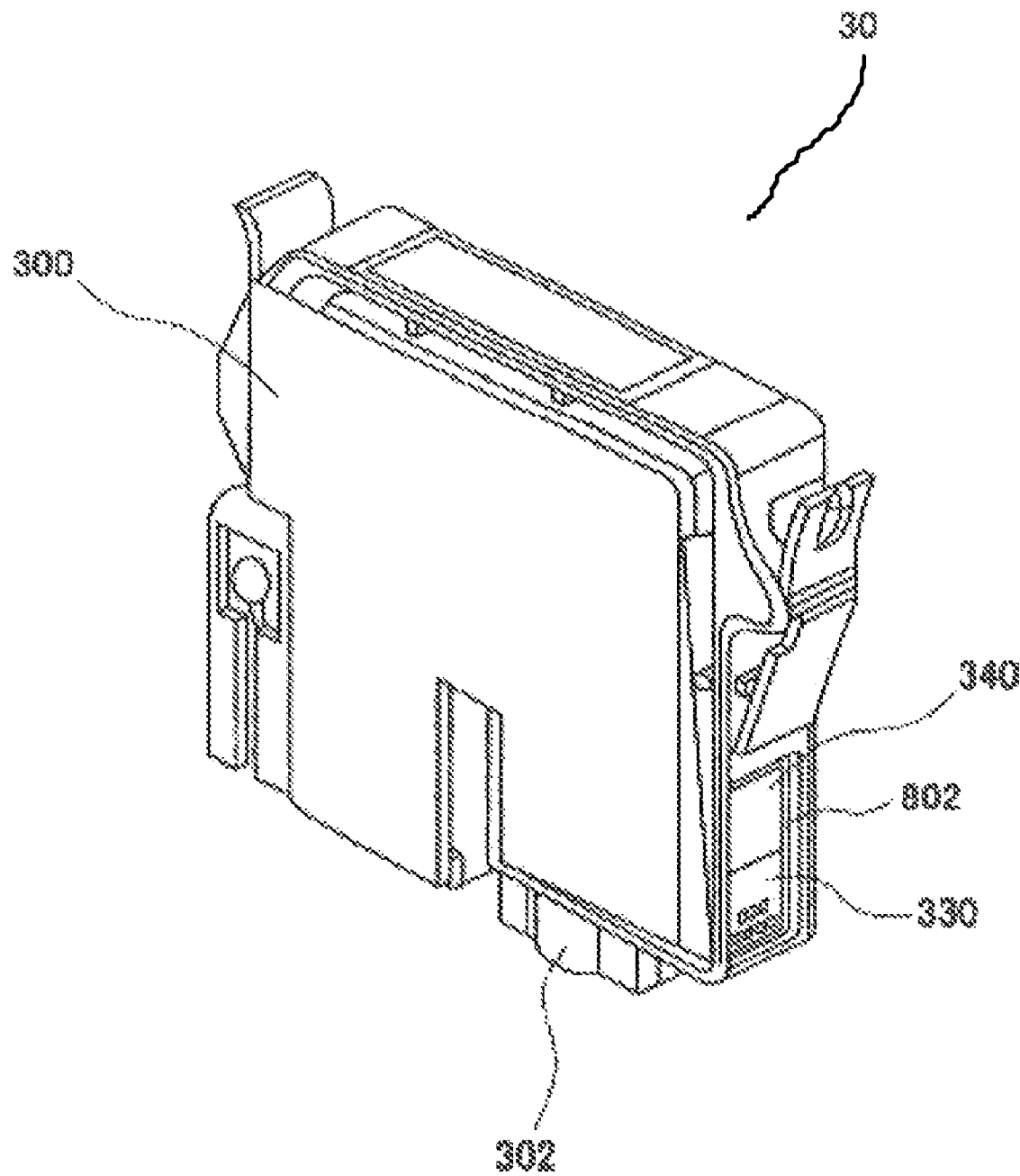
FIG. 22 is a schematic perspective view showing another example of ink cartridge 31.
Figure 23:
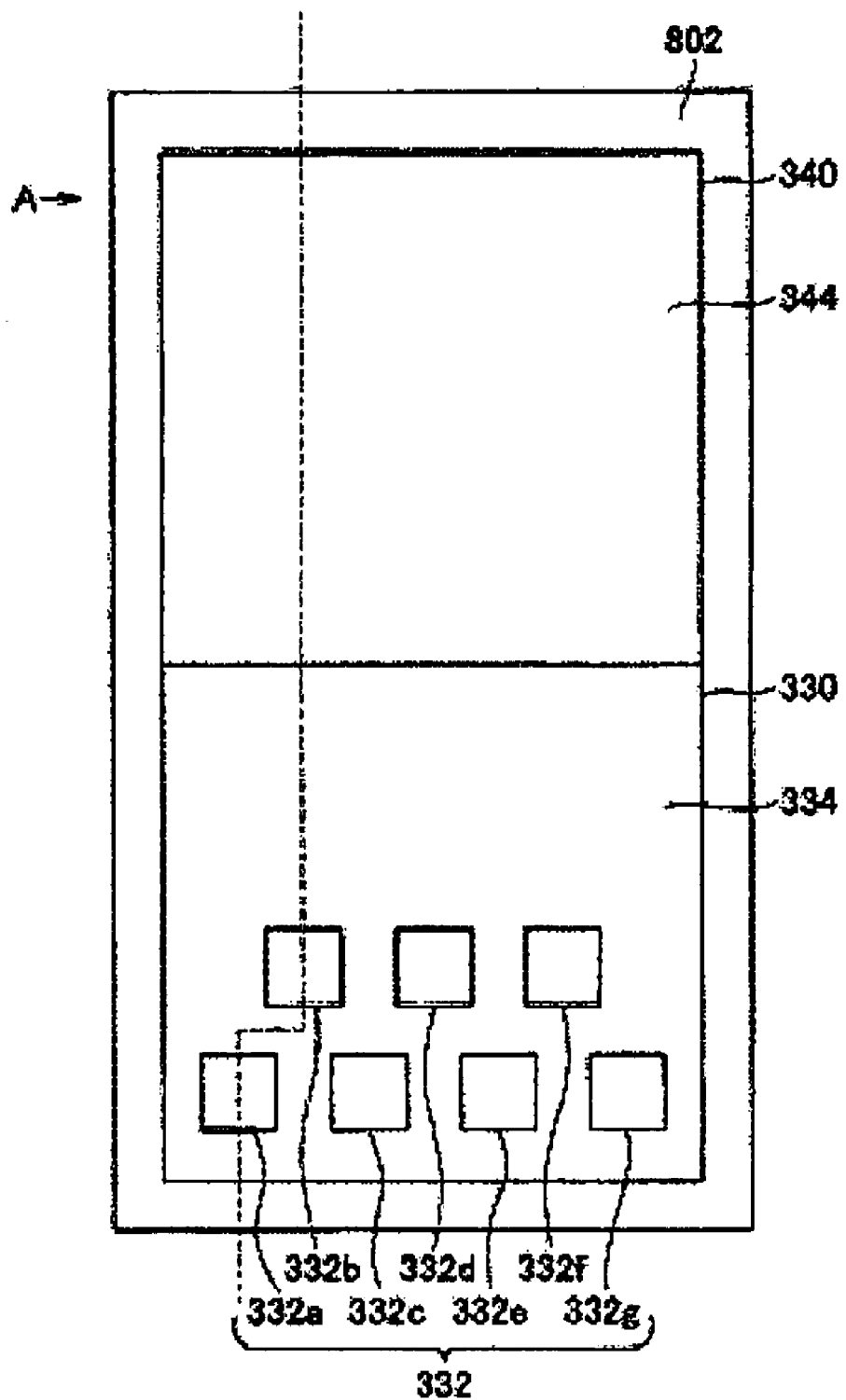
FIG. 23 is a schematic view showing the ink information storage section 330 and the advance payment information storage section 340 accommodated in a chip accommodating section 802.
Figure 24:
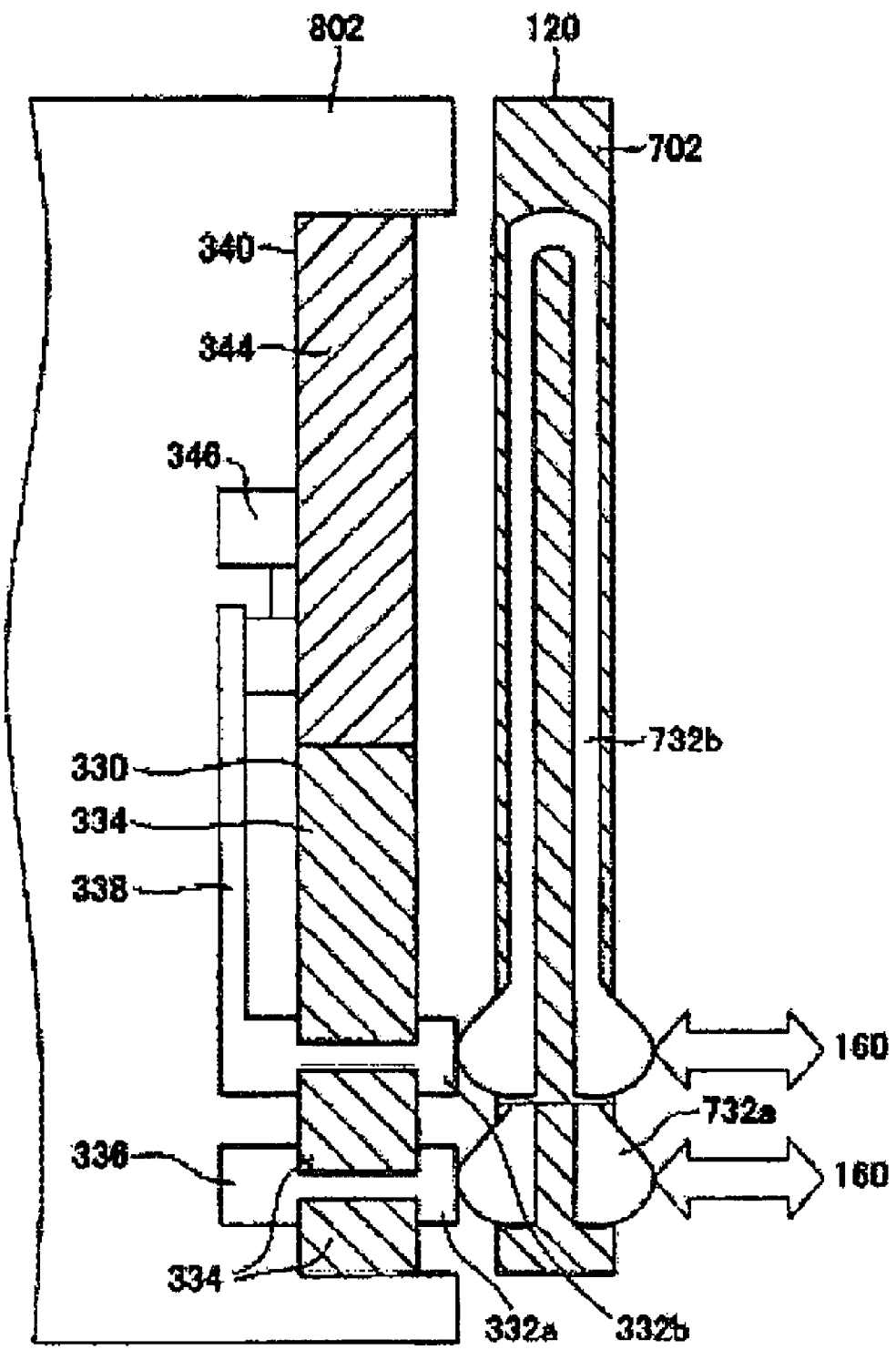
FIG. 24 a schematic view showing an example of electrical connection between the ink information storage section 330 and the advance payment information storage section 340.

FIG. 22 is a schematic perspective view showing another example of ink cartridge 31. FIG. 23 is a schematic view showing an ink information storage section 330 and an advance payment information storage section 340 accommodated in a chip accommodating section 802. FIG. 24 a schematic view showing an example of electrical connection between the ink information storage section 330 and the advance payment information storage section 340. Specifically, the schematic view of FIG. 24 is a cross-sectional view in the case that the ink cartridge 31 is accommodated in the cartridge accommodating section 102, which is obtained by cutting the ink information storage section 330 and the advance payment information storage section 340 by a broken line shown in FIG. 23 and viewing from A direction.

When the carriage 100 includes the connecting terminal 120 shown in FIG. 21, the ink cartridge 31 shown in FIG. 22 includes the chip accommodating section 802, the ink information storage section 330 and the advance payment information storage section 340 instead of the chip accommodating section 800, the ink information storage section 310 and the advance payment information storage section 320 shown in FIG. 13. In this case, the ink information storage section 330 includes a substrate 334, a connecting terminal 332, a memory 336 that stores therein information on ink and a connecting line 338. The connecting terminal 332 is exposed on one surface of the substrate 334 and is penetrated through the other surface of the substrate 334. The memory 336 and the connecting line 338 are disposed on the other surface of the substrate 334 and are electrically connected to the corresponding connecting terminals 332 (332a and 332b), respectively.

The advance payment information storage section 340 includes a substrate 344 and a memory 346 that stores therein IC credits. The memory 346 is mounted on a surface which faces the direction the same as that of the other surface of the substrate 334.

When the ink cartridge 31 is accommodated in the cartridge accommodating section 102, each of the connecting terminals 332a, b, c, d, e, f and g of the ink cartridge 31 is electrically connected to each opposed conductor section 732a, b, c, d, e, f and g on the connecting terminal 120 of the carriage 100.

The connecting line 338 is electrically connected to the memory 346 of the advance payment information storage section 340 while the advance payment information storage section 340 is stored in the chip accommodating section 802. Thereby when the connecting line is electrically connected to the conductor section 732b of the connecting terminal 120 included in the carriage 100, it can be electrically connected to the memory 346 in FIG. 24.

Figure 25:
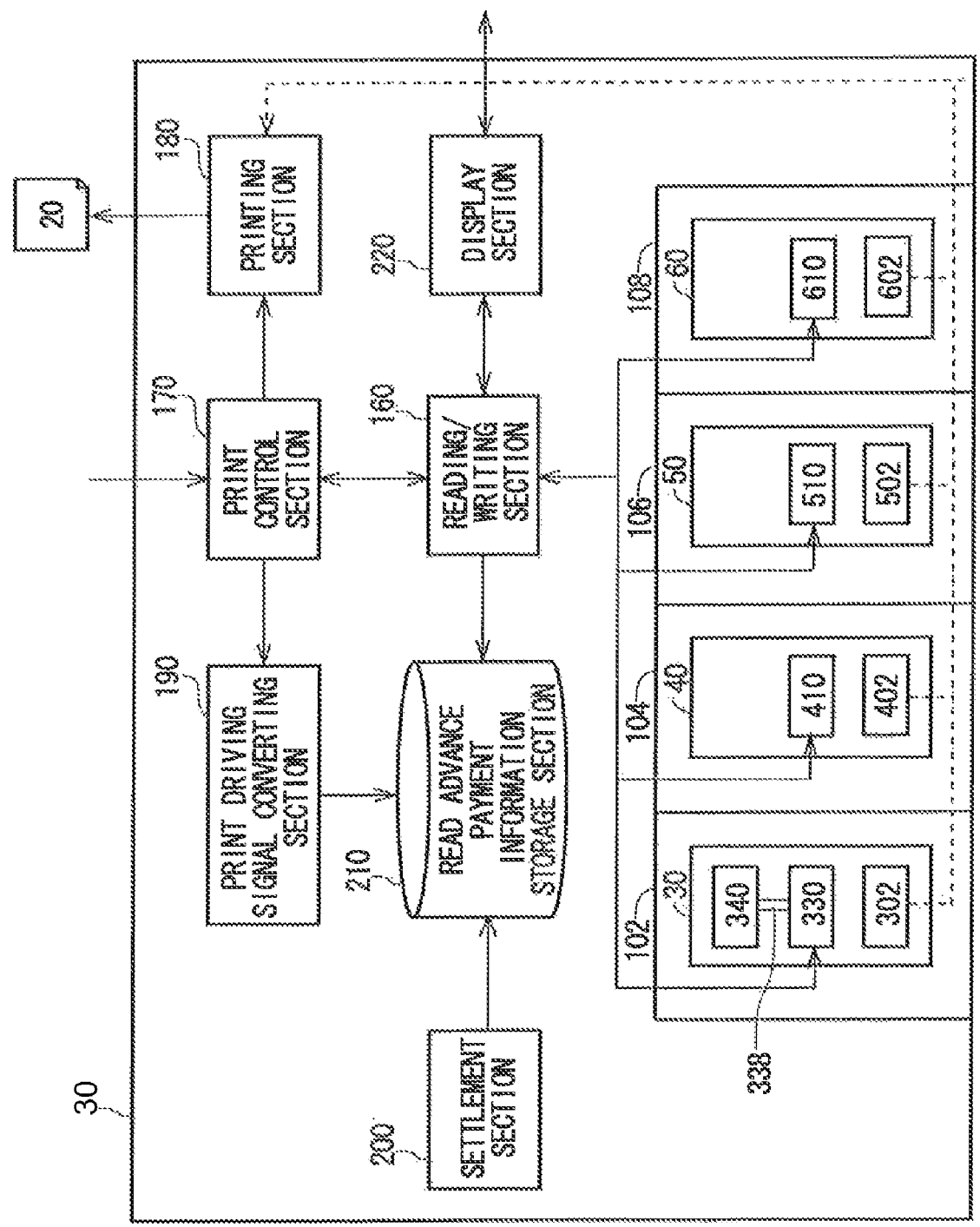
FIG. 25 is a block diagram showing further another example of block configuration of the printer 30.

FIG. 25 is a block diagram showing further another example of block configuration of the printer 30. The block diagram of FIG. 25 shows a block configuration in the case that the reading/writing section 160 is electrically connected to the conductor sections 732a and b. The printer 30 includes cartridge accommodating sections 102, 104, 106 and 108, a reading/writing section 160, a print control section 170, a printing section 180, a print driving signal converting section 190, a settlement section 200, a read advance payment information storage section 210 and a display section 220.

The reading/writing section 160 is electrically connected to the conductor section 732a shown in FIG. 24 and reads/writes the information on ink stored in the memory 336 included in the ink information storage section 330 to/from the ink cartridge 31 accommodated in the cartridge accommodating section 102 through the conductor section 732a and the connecting terminal 332a. Additionally, the reading/writing section 160 is electrically connected to the conductor section 732b and reads/writes IC credits stored in the memory 346 included in the advance payment information storage section 340 through the connecting terminal 332b and the connecting line 338. Thereby a function to read/write the color material information and the advance payment information can be easily implemented by the connecting line 338 of the ink cartridge 31.

The reading/writing section 160 reads/writes the information on ink stored in the memories included in the ink information storage sections 410, 510 and 610 to/from the ink cartridges 40, 50 and 60 accommodated in the cartridge accommodating sections 104, 106 and 108. Here, each of the cartridge accommodating sections 102, 104, 106 and 108, the print control section 170, the printing section 180, the print driving signal converting section 190, the settlement section 200, the read advance payment information storage section 210 and the display section 220 is the same as each component shown in FIG. 16, so that the description is omitted.

Figure 26:
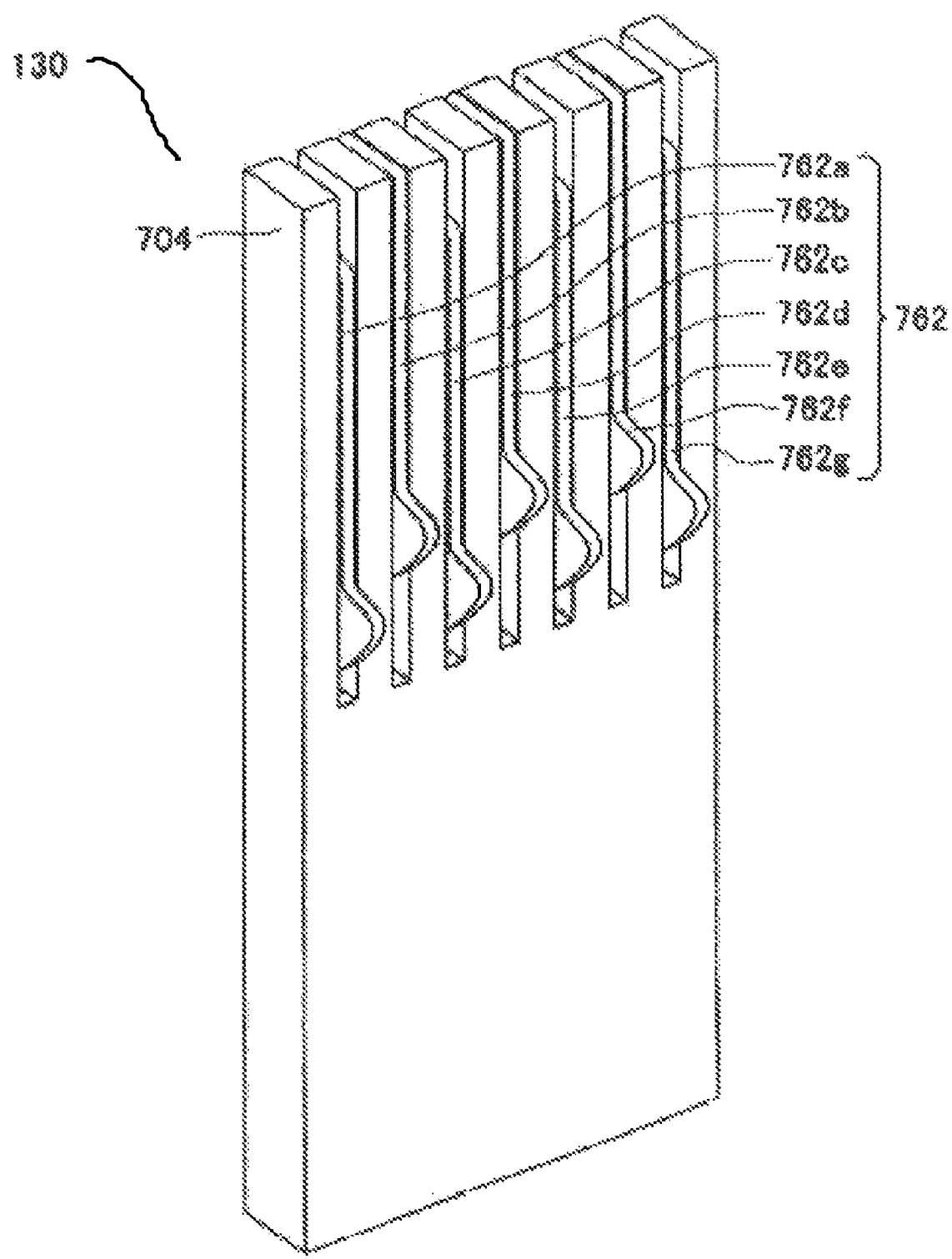
FIG. 26 is a schematic perspective view of the connecting terminal 130 included in the carriage 100.

FIG. 26 is a schematic perspective view of a connecting terminal 130 included in the carriage 100. The carriage 100 may include the connecting terminal 130 instead of the connecting terminal 110 shown in FIG. 12 or the connecting terminal 120 shown in FIG. 21. The connecting terminal 130 includes a conductor section 762 and an insulator section 704 as shown in FIG. 26. In the embodiment shown in FIG. 26, seven conductor sections 762a, b, c, d, e, f and g are insulated from each other by the insulator section 704.

Figure 27:
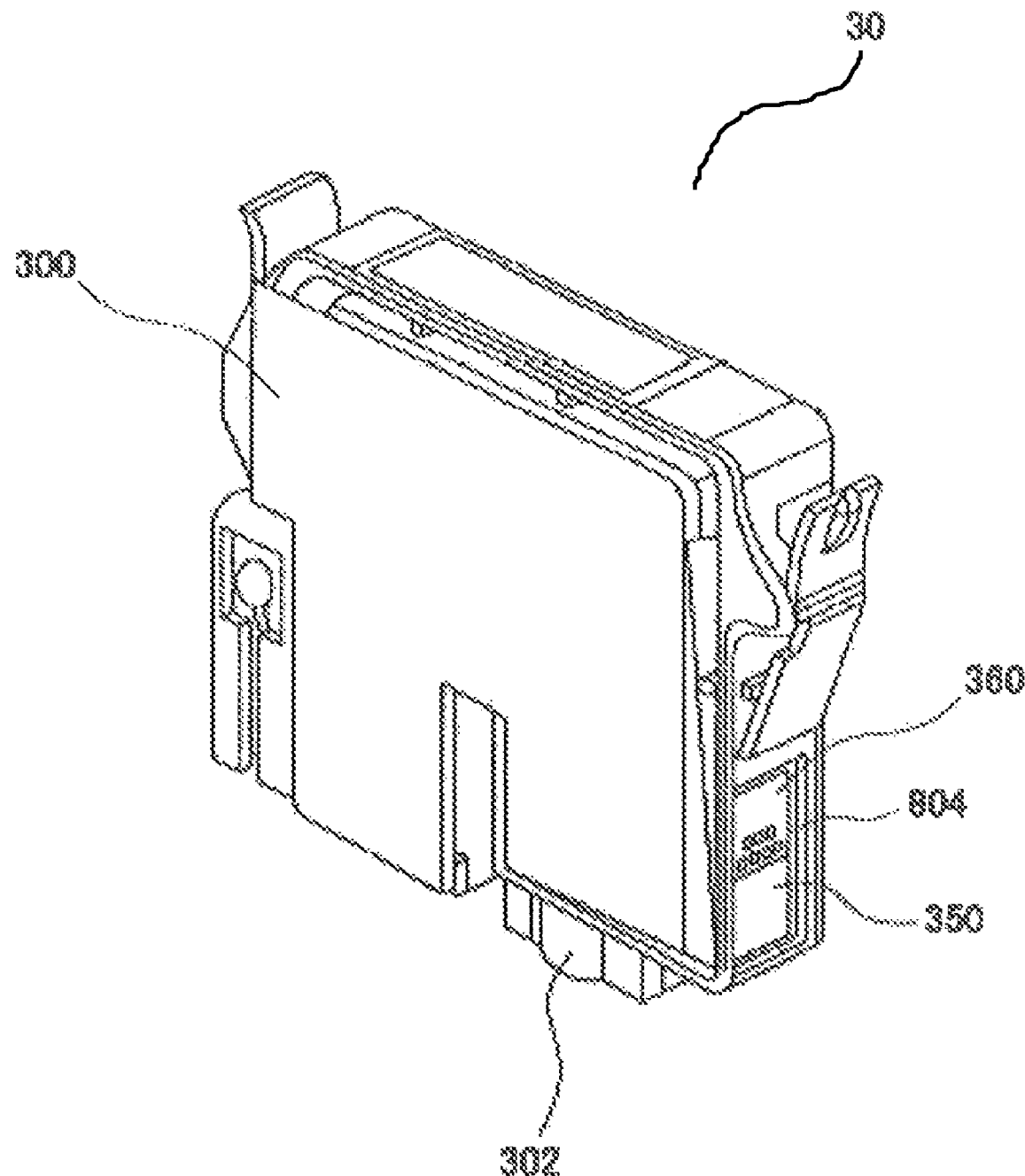
FIG. 27 is a schematic perspective view showing further another example of ink cartridge 31.
Figure 28:
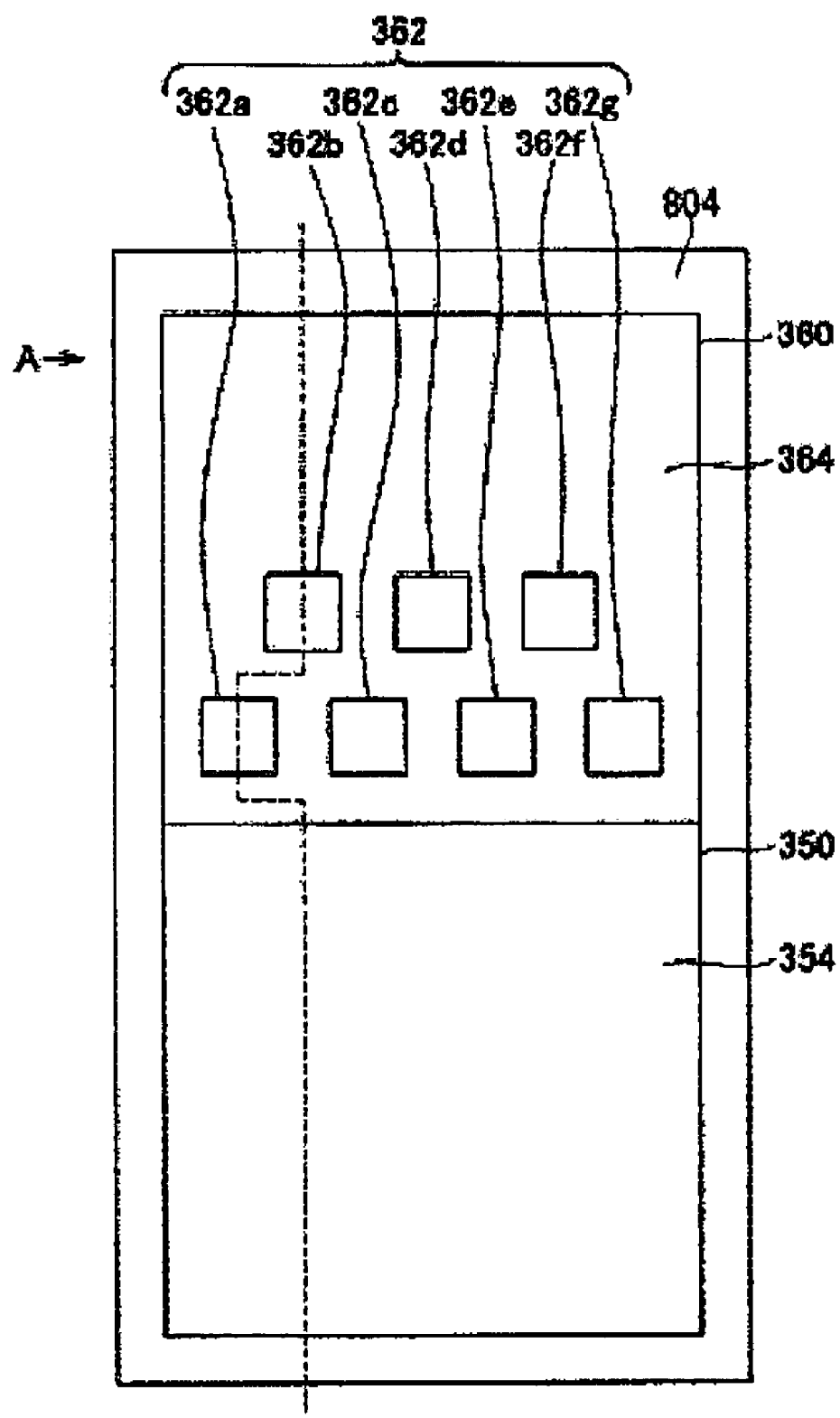
FIG. 28 is a schematic view showing an ink information storage section 350 and an advance payment information storage section 360 accommodated in a chip accommodating section 804.
Figure 29:
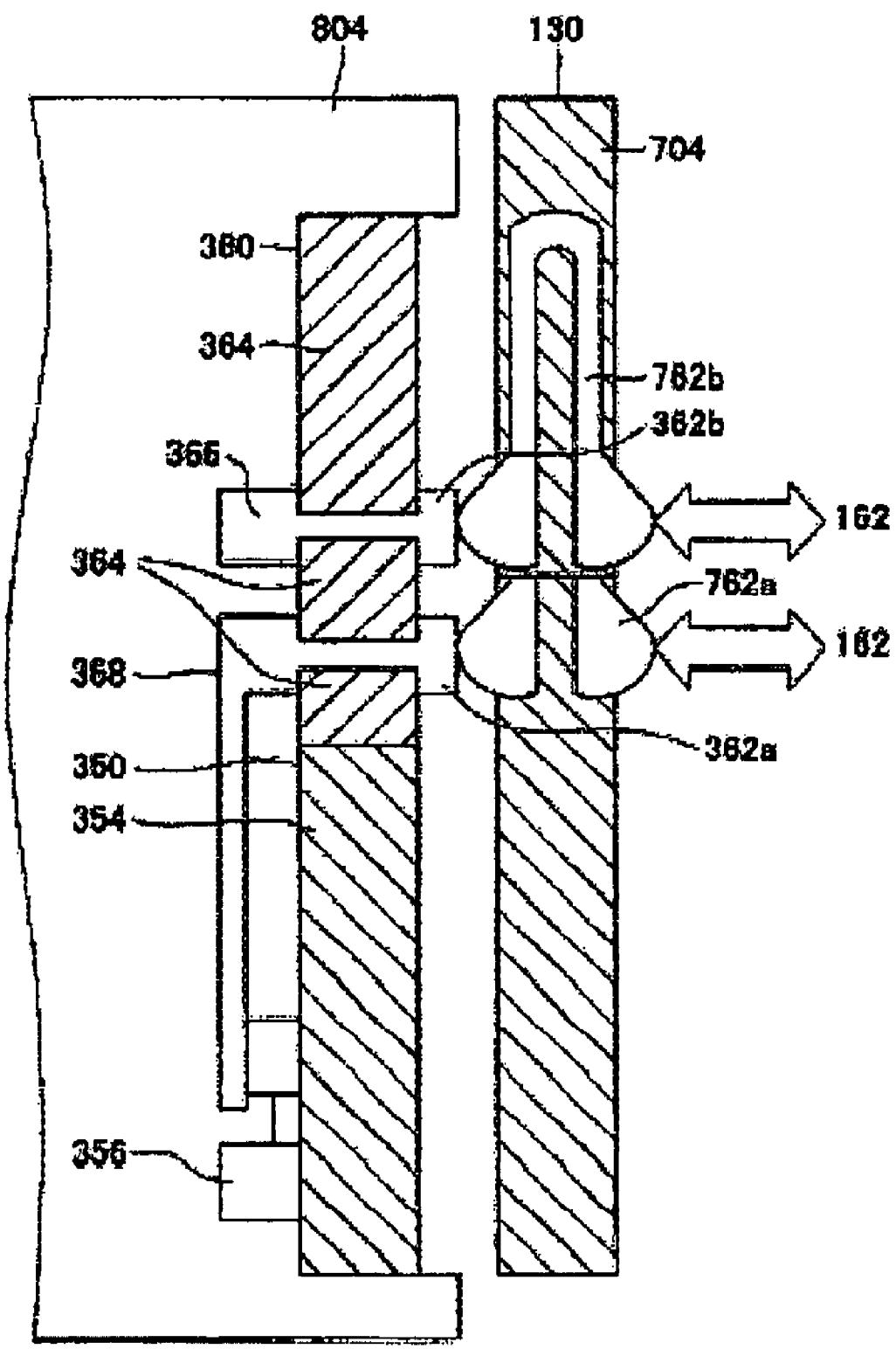
FIG. 29 is a schematic view showing an example of electrical connection between the ink information storage section 350 and the advance payment information storage section 360.

FIG. 27 is a schematic perspective view showing further another example of ink cartridge 31. FIG. 28 is a schematic view showing an ink information storage section 350 and an advance payment information storage section 360 accommodated in a chip accommodating section 804. FIG. 29 is a schematic view showing an example of electrical connection between the ink information storage section 350 and the advance payment information storage section 360. The schematic view of FIG. 29, specifically, is a cross-sectional view in the case that the ink cartridge 31 is accommodated in the cartridge accommodating section 102, which is obtained by cutting the ink information storage section 350 and the advance payment information storage section 360 by a dashed line shown in FIG. 28 and viewing from A direction.

When the carriage 100 includes the connecting terminal 130 shown in FIG. 26, the ink cartridge 31 shown in FIG. 27 includes the chip accommodating section 804, the ink information storage section 350 and the advance payment information storage section 360 instead of the chip accommodating section 800, the ink information storage section 310 and the advance payment information storage section 320 shown in FIG. 13. The ink information storage section 350 includes a substrate 354 and a memory 356 disposed on one surface of the substrate 354 that stores therein information on ink.

The advance payment information storage section 340 includes a substrate 364, a connecting terminal 362, a memory 366 that stores therein IC credits and a connecting line 368. The connecting terminal 362 is exposed on one surface of the substrate 364 and is penetrated through the other surface of the substrate 364. The memory 366 and the connecting line 368 are disposed on the other surface of the substrate 364 and are electrically connected to the corresponding connecting terminals 362 (362a and b), respectively.

When the ink cartridge 31 is accommodated in the cartridge accommodating section 102, each of the connecting terminals 362a, b, c, d, e, f and g of the ink cartridge 31 is electrically connected to each opposed conductor section 762a, b, c, d, e, f and g on the connecting terminal 130 of the carriage 100.

The connecting line 368 is electrically connected to the memory 356 included in the ink information storage section 350. Additionally, the connecting line 368 is electrically connected to the connecting terminal 362a. That is, when the connecting line is electrically connected to the conductor section 762a of the connecting terminal 130 included in the carnage 100, it can be electrically connected to the memory 356. Thereby a function to read/write the color material information and the advance payment information can be easily implemented by the connecting line 368 of the ink cartridge 31.

Figure 30:
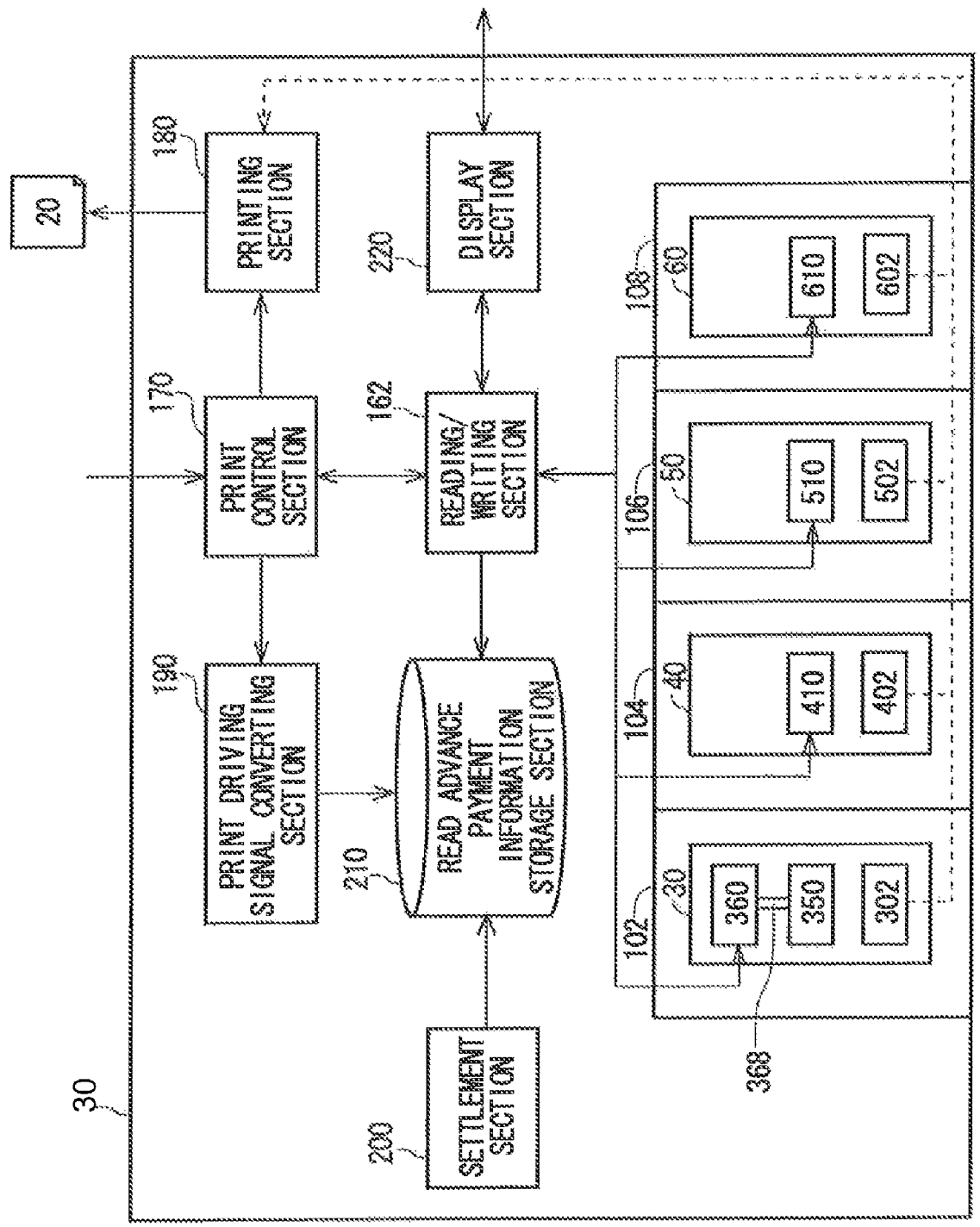
FIG. 30 is a block diagram showing further another embodiment of the block configuration of the printer 30.

FIG. 30 is a block diagram showing further another example of the block configuration of the printer 30. The block diagram of FIG. 30 shows a block configuration in the case that the reading/writing section 162 is electrically connected to the conductor sections 762a and b as shown in FIG. 29. The printer 30 includes cartridge accommodating sections 102, 104, 106 and 108, the reading/writing section 160, the print control section 170, the printing section 180, the print driving signal converting section 190, the settlement section 200, the read advance payment information storage section 210 and the display section 220.

The reading/writing section 162 reads/writes IC credits stored in the memory 366 included in the advance payment information storage section 360 to/from the ink cartridge 31 accommodated in the cartridge accommodating section 102 through the conductor section 762b and the connecting terminal 362b. Additionally, the reading/writing section 162 reads/writes the information on ink stored in the memory 356 included in the ink information storage section 350 through the conductor section 762a, the connecting terminal 362a and the connecting line 368.

The reading/writing section 162 reads/writes the information on ink stored in the memories included in the ink information storage section 410, 510 and 610 to/from the ink cartridges 40, 50 and 60 accommodated in the cartridge accommodating sections 104, 106 and 108. Here, each of the cartridge accommodating sections 102, 104, 106 and 108, the print control section 170, the printing section 180, the print driving signal converting section 190, the settlement section 200, the read advance payment information storage section 210 and the display section 220 is the same as each component shown in FIG. 16, so that the description is omitted.

Here, on the ink information storage section 310 and the advance payment information storage section 320, information may not be read/written in not only a contact manner but also a noncontact manner in the above described embodiment. In this case, the ink information storage section 310 and the advance payment information storage section 320 may be a magnetic memory or an optical memory. Additionally in this case, the connecting line 150 may magnetically or optically connect the ink information storage section 310 and the advance payment information storage section 320. Then, the ink information storage sections 330 and 350, the advance payment information storage sections 340 and 360 and the connecting lines 338 and 368 may be as described above.

Moreover, the connecting line may be formed separate from the ink information storage section and the advance payment information storage section and embedded in the chip accommodating section side. Further, each of the ink cartridges 40, 50 and 60 may include the advance payment information storage section instead of or in addition to the ink cartridge 31.

While the present invention have been described with the embodiment, the technical scope of the invention not limited to the above described embodiment. The present invention may applicable to a printer of the inkjet recording apparatus and a recording apparatus such as a copy machine and a facsimile. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. A printer that prints on a medium with a color material, comprising:
    a cartridge;
    a cartridge accommodating section that removably accommodates the cartridge to which an advance payment information storage section for storing therein advance payment information before a use of the cartridge is attached and which contains the color material,
    an advance payment information reading/writing section that reads/writes the advance payment information to/from the advance payment information storage section;
    a print control section that outputs a print driving signal for controlling to print;
    a printing section that prints by using the color material in the cartridge based on the print driving signal outputted from the print control section;
    a print driving signal converting section that acquires the print driving signal outputted from the print control section and converts the same to accounting information; and
    a settlement section that settles the advance payment information read by the advance payment information reading/writing section based on the accounting information converted by the print driving signal converting section; wherein
    the cartridge includes an ink information storage section that stores therein information on a printing amount of ink used by the cartridge, the advance payment information reading/writing section reads the advance payment information corresponding to the remaining amount enough to print with the cartridge based on the information on the printing amount of ink stored in the ink information storage section before the printing section prints,
    the print control section outputs the print driving signal to the printing section provided that the advance payment information corresponding to the remaining amount is read from the advance payment information reading/writing section,
    the print driving signal converting section judges whether the advance payment information storage section is attached to the cartridge, and
    the advance payment information storage section is removably attached to the cartridge.

2. The printer as set forth in claim 1, wherein the print control section prevents the printing section from printing when the advance payment information read by the advance payment information reading/writing section indicates that there is no advance payment.

3. The printer as set forth in claim 1, wherein the print control section prevents the printing section from printing when the advance payment information is not read from the cartridge accommodated in the cartridge accommodating section.

4. The printer as set forth in claim 1, wherein
    the ink information storage section stores therein information on a color material, and
    the ink information storage section includes the advance payment information storage section.

* * * * *